(12) United States Patent
Tanaka

(10) Patent No.: US 8,347,363 B2
(45) Date of Patent: Jan. 1, 2013

(54) CONTENTS RETRIEVAL SYSTEM AND CONTENTS RETRIEVAL METHOD

(75) Inventor: Toshiyuki Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 624 days.

(21) Appl. No.: 12/598,095

(22) PCT Filed: Apr. 6, 2009

(86) PCT No.: PCT/JP2009/001587
§ 371 (c)(1),
(2), (4) Date: Oct. 29, 2009

(87) PCT Pub. No.: WO2009/125571
PCT Pub. Date: Oct. 15, 2009

(65) Prior Publication Data
US 2010/0146597 A1    Jun. 10, 2010

(30) Foreign Application Priority Data

Apr. 10, 2008    (JP) .................................. 2008-102276

(51) Int. Cl.
*G06F 21/00* (2006.01)
(52) U.S. Cl. .............................. 726/4; 709/227; 709/238
(58) Field of Classification Search ...... 726/4; 709/227, 709/238
See application file for complete search history.

(56) References Cited

U.S. PATENT DOCUMENTS

| 6,567,983 | B1 * | 5/2003 | Shiimori | 725/105 |
| 2002/0046232 | A1 * | 4/2002 | Adams et al. | 709/200 |
| 2006/0167940 | A1 * | 7/2006 | Colton et al. | 707/104.1 |
| 2008/0043111 | A1 * | 2/2008 | Anderson | 348/211.3 |

FOREIGN PATENT DOCUMENTS

| JP | 11-203359 | | 7/1999 |
| JP | 2002-209163 | A | 7/2002 |
| JP | 2003-233555 | A | 8/2003 |
| JP | 2003-303211 | A | 10/2003 |
| JP | 2006-333388 | A | 12/2006 |

OTHER PUBLICATIONS

International Search Report for International Application No. PCT/JP2009/001587, Jun. 2, 2009, Panasonic Corporation.

* cited by examiner

*Primary Examiner* — Andrew Georgandellis
(74) *Attorney, Agent, or Firm* — RatnerPrestia

(57) ABSTRACT

In a contents retrieval system, when a publisher terminal uploads shared contents to a shared server, the shared server stores the shared contents in a contents area of a contents database, a partial data formation section forms partial data specifying the shared contents and stores the formed partial data in a partial data area, and a URL generation section forms a URL linked to the shared contents and stores the URL in a URL area. When the contents retrieval section receives partial data from the retriever terminal, it collates the received partial data with the partial data in partial data area of the contents database. When the partial data is found, the contents retrieval section replies a URL of the corresponding shared contents to the retriever terminal.

8 Claims, 23 Drawing Sheets

FIG. 5
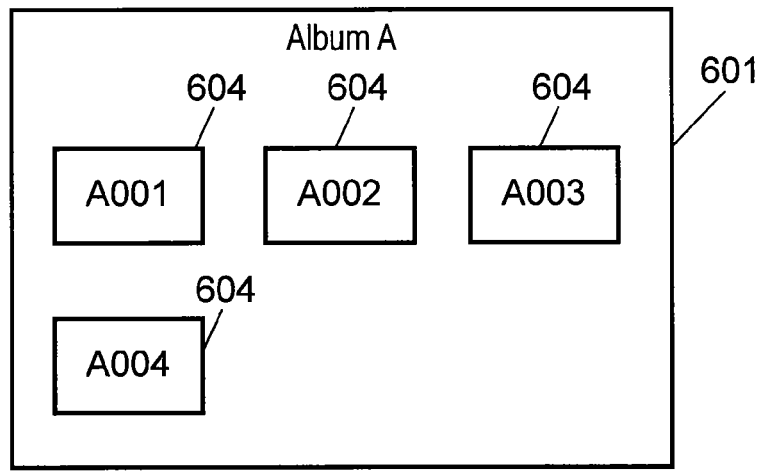
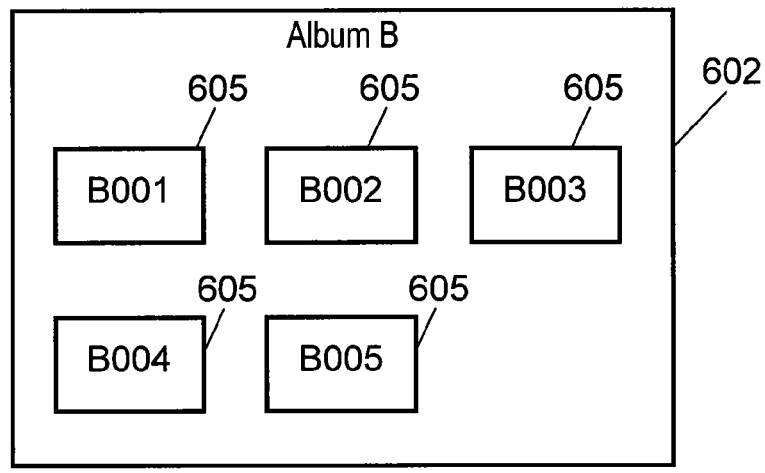
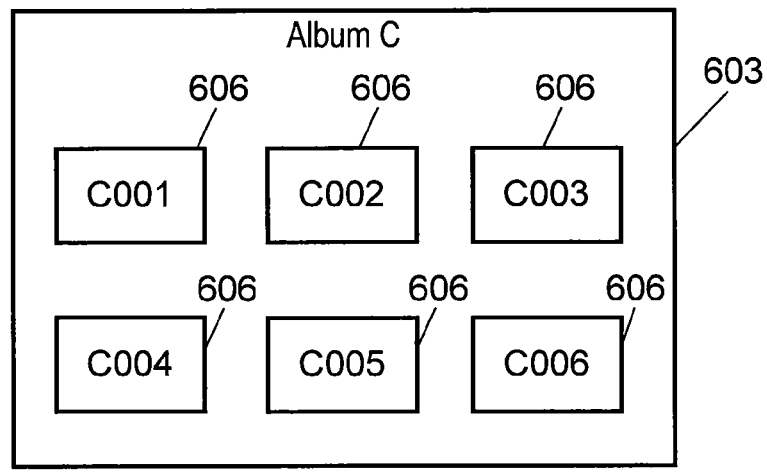

From:abc@xxx.ne.jp
To:pqr@yyy.com
Subject: Shared photograph album

Photographs taken at the party the other day are uploaded to the usual album shared site.   See in the above-mentioned site by using the attached photograph.

Attached file:Party-06.jpg

701

CONTENTS RETRIEVAL SYSTEM AND CONTENTS RETRIEVAL METHOD

This application is a U.S. National Phase Application of PCT International Application PCT/JP2009/001587.

TECHNICAL FIELD

The present invention relates to a contents retrieval system and a contents retrieval method, which enable only limited retrievers to retrieve contents when the contents are shared by a plurality of users on the network.

BACKGROUND ART

One of methods of using the Internet is a mechanism in which a publisher of contents uploads the contents to a server and the like on the network so as to publish the contents. Most typically, there are many systems in which a publisher uploads images taken by a digital camera and allows all persons connected to the Internet to retrieve and browse the images or allows a plurality of certain persons to retrieve and browse them (hereinafter, referred to as a "network photograph album").

The same thing can be also achieved by using a web page formed by an individual publisher. However, formation of a photograph album by grouping a plurality of photographs, and preparation and management for determining persons who can retrieve the photograph album are heavy burden to individual publishers. Therefore, in general, companies specialized in such functions and managements provide charged or free services. In the case of a network photograph album, for example, the Internet service companies (referred to as "providers"), digital camera manufacturing companies, photographic film manufacturing companies, and the like, do such service.

It is easy to publish photographs uploaded in a server without any restriction. That is to say, persons are simply required to publish a URL of the shared server. However, in general, it is required to allow only certain individuals such as relatives, friends, classmates, and associate members to retrieve and browse the uploaded photographs. Therefore, mechanisms for restriction are demanded.

Well-known methods include a method for letting authorized retrievers to know a URL (Uniform Resource Locator) of a web site by which photographs can be retrieved in a unit of a photograph album, and a URL by which individual photographs can be retrieved. In the service using such methods, a publisher publishes certain photograph albums or individual photographs in advance. Then, the publisher sends a URL for retrieving for the photograph album or the photographs to authorized retrievers by mail. The retrievers can retrieve authorized photograph albums or photographs by clicking a URL described in the received mail or an icon or a character string linked to the URL. Outsiders cannot retrieve them because they do not know the URL.

Furthermore, there is also a method in which a publisher uses an identification code (hereinafter, referred to as "ID") and a password. According to this method, only persons who have the ID or the password or persons who input it can retrieve contents.

For example, patent document 1 describes an example of achieving restricted management by using both ID and password. The system described in patent document 1 proposes a plurality of photograph albums registered on the network and a mechanism for restricting retrieving of each photograph album. Patent document 1 describes a retrieving and managing method as a general mechanism for restricting retrieving by using ID obtained by registration in order to use the service and a password for further improving the restriction level.

The network photograph album service described in patent document 1 and a large number of network album services currently carried out all enable certain retrievers to retrieve photograph contents uploaded by publishers on the network. Naturally, it is necessary to let retrievers authorized to retrieve the contents to know ID and/or password in advance.

However, in a method in which a publisher sends a URL to retrievers, it is difficult for the retrievers receiving the URL to memorize a long alphanumeric character that does not have meaning as a word. Furthermore, the retrievers carry out a mechanical operation by just copying a character part for connection by using the URL. Therefore, when the retrievers use the same URL again, they store the above-mentioned character string in the computer they use. However, since the above-mentioned character string is an alphanumeric character having no meaning, it is not easy to imagine what the photograph album or photograph is included in advance. As a result, the retrievers cannot know the specific contents of the photograph before connection by using the URL. Therefore, when the retriever stores a plurality of URLs corresponding to a plurality of photograph albums, it is extremely difficult to quickly select the URL corresponding to the photograph album or photograph the retriever desires to see. Consequently, for the retriever, retrieving for the contents again is a complex operation.

Next, in the method in which a publisher registers IDs of retrievers who are authorized to retrieve the contents, firstly, the retriever is required to register himself/herself as a retriever and to obtain ID in order to receive services. Thereafter, the publisher needs to grasp IDs of a plurality of authorized retrievers. Then, the publisher is required to register the IDs of authorized retrievers in the published photograph album. As mentioned above, many procedures are necessary in order to enable retrievers to retrieve contents actually. Of course, also in the method in which retrievers have registered IDs in advance, it is difficult for the retrievers to imagine a photograph album or contents of the photograph album before retrieving.

Furthermore, when a publisher distributes or notifies a password to certain retrievers, the connection restriction can be strengthened by using also a password or specifying the kinds of photograph albums that can be retrieved. However, as compared with the case where only ID is used as mentioned above, naturally, a larger number of procedures are required. Therefore, labors of publishers and retrievers are further increased. Furthermore, similarly to the above description, retrievers cannot imagine the contents of photographs before retrieving.

[Patent document 1] Japanese Patent Unexamined Publication No. H11-203359

SUMMARY OF THE INVENTION

A contents retrieval system of the present invention includes a shared server, a first terminal device, and a second terminal device, which are connected to a network. The shared server stores one or a plurality of shared contents. The first terminal device transmits the shared contents to the shared server. The second terminal device receives the shared contents from the shared server.

The shared server includes a transmitting and receiving section, a partial data formation section, a URL generation section, a contents storage section, and a contents retrieval section. The transmitting and receiving section transmits/ receives data with respect to the first terminal device and the second terminal device. The partial data formation section forms partial data corresponding to the shared contents. The URL generation section generates a URL corresponding to the shared contents. The contents storage section stores the shared contents, the partial data and the URL in such a way that they are associated with each other. The contents retrieval section retrieves the shared contents corresponding to the partial data.

The shared server replies the partial data to the first terminal device, and the first terminal device transmits the partial data to the second terminal device.

The transmitting and receiving section receives the partial data from the second terminal device. Then, the contents retrieval section retrieves the shared contents corresponding to the partial data, in which the shared contents are stored in the contents storage section in such a way that they are associated with the received partial data. Furthermore, the contents retrieval section allows the transmitting and receiving section to transmit the URL corresponding to the retrieved shared contents to the second terminal device.

With such a configuration, the contents retrieval system, which stores shared contents in a shared server on the network and allows a plurality of certain retrievers to browse the shared contents, can be configured. By using partial data of the shared contents, the retriever can retrieve and browse certain terminals without using conventional alphanumeric characters such as ID and password, which are hard to remember. Furthermore, in order to solve the problem that it is difficult to grasp the correspondence between contents and a character string such as ID, password, URL, or the like, the present invention uses partial data of the contents. As a result, a retriever can intuitively associate the contents to be browsed with the shared contents.

Furthermore, according to the contents retrieval system of the present invention, the first terminal device may receive the partial data from the shared server, and transmit the received partial data to the second terminal device. With such a configuration, since a publisher is not required to form partial data, processing load of a terminal of the publisher can be reduced. Furthermore, a retriever can receive partial data by, for example, an attached file of mail from the publisher. Therefore, the retriever can obtain the partial data easily.

Furthermore, according to the contents retrieval system of the present invention, the first terminal device forms the partial data of the shared contents, and may transmit the partial data to both the shared server and the second terminal device or to only the second terminal device. With such a configuration, the publisher is not required to request the shared server to form partial data when the publisher publishes the shared contents, so that the publisher can form the partial data to his/her liking.

Furthermore, according to the contents retrieval system of the present invention, the shared contents are a photograph album including a plurality of photograph data. The partial data may be at least a certain piece of photograph data in the photograph album. With such a configuration, a publisher can readily share photographs taken at, for example, parties and trips, among family members and friends living in remote areas. Moreover, the partial data for retrieving can be formed simply by selecting one representative photograph in the photograph album. Therefore, the partial data for retrieving can be formed extremely easily.

Furthermore, according to the contents retrieval system of the present invention, the shared contents are moving image data. The partial data may be at least a certain frame of moving image data in the moving image data. With such a configuration, not only still pictures but also moving images taken by a publisher in various events such as sports meeting can readily be shared among family members and friends living in remote areas. Moreover, partial data for retrieving may be one representative moving image frame in the moving images. Therefore, partial data for retrieving can be easily transmitted and received by mail and the like.

Furthermore, according to the contents retrieval system of the present invention, the shared server further includes a feature amount extracting section for extracting a feature amount of the partial data, and a software storage section for storing execution software to extract the feature amount. The contents storage section stores a feature amount corresponding to the shared contents in the software storage section. When the transmitting and receiving section receives a request to retrieve contents from the second terminal device, the contents retrieval section allows the transmitting and receiving section to transmit the execution software to the second terminal device. Furthermore, the second terminal device receives the execution software from the shared server, and extracts a feature amount from the partial data by the received execution software. Then, the partial data is replaced with the extracted feature amount by the second terminal device. Furthermore, the second terminal device may transmit the partial data as the extracted feature amount to the shared server.

With such a configuration, as data for retrieving, the contents retrieval system uses the feature amount extraction data from the partial data instead of partial data themselves. Thus, an amount of data for retrieving can be reduced. As a result, processing load in the shared server can be reduced. Furthermore, the contents retrieval system converts the partial data into feature amount extraction data which only the retriever and the shared server can know, thereby using the feature amount extraction data for authentication. As a result, the contents retrieval system can further improve security.

Furthermore, according to the contents retrieval system of the present invention, when the transmitting and receiving section receives a mail address of the second terminal device authorized to retrieve the shared contents from the first terminal device, the partial data formation section forms partial data having a mail address in which the mail address is added to the partial data. Furthermore, the transmitting and receiving section transmits the partial data having a mail address to the second terminal device. The second terminal device transmits the partial data having a mail address to the shared server. The transmitting and receiving section may receive the partial data having a mail address as the partial data from the second terminal device.

Furthermore, according to a contents retrieval method of the present invention, the shared server further includes a feature amount extracting section for extracting a feature amount of the partial data. The contents storage section may replace the partial data with the feature amount corresponding to the shared contents so as to update the partial data, and may store the partial data in the partial data formation section.

Furthermore, the contents retrieval method of the present invention is a method of a contents retrieval system including a shared server, a first terminal device and a second terminal device, which are connected to the network. The shared server stores one or a plurality of shared contents. The first terminal device transmits the shared contents to the shared server. The second terminal device receives the shared contents from the shared server.

The contents retrieval system includes a first receiving step, a first storing step, a first partial data formation step, a URL formation step, a second storing step, a replying step, a second receiving step, a retrieving step, and transmitting step. In the shared server, the first receiving step receives the shared contents from the first terminal device. The first storing step stores the shared contents in the shared server. The first partial data formation step forms partial data corresponding to the received shared contents. The URL formation step forms URL corresponding to the received shared contents. The second storing step stores the formed partial data and the URL in such a way that the partial data and the URL are associated with the shared contents. The replying step replies the partial data to the first terminal device. The second receiving step receives partial data from the second terminal device. The retrieving step retrieves the shared contents corresponding to the received partial data. The first transmitting step transmits the URL corresponding to the retrieved shared contents to the second terminal device. Furthermore, in the first terminal device, the second transmitting step may transmit the partial data, which are received from the shared server in the replying, to the second terminal device authorized to retrieve and browse.

Furthermore, the contents retrieval method of the present invention further includes a feature extraction step, a third receiving step, a third transmitting step, and a fourth receiving step in the shared server. The first feature extracting step extracts and stores a feature amount of the partial data. The third receiving step receives a contents retrieval request from the second terminal device. The third transmitting step transmits execution software for extracting the feature amount to the second terminal device when the contents retrieval request is received. The fourth receiving step receives the feature amount as the partial data from the second terminal device. The second terminal device may further include a second feature extraction step of extracting the feature amount from the partial data by using a feature amount extracting function by the execution software, and a fourth transmitting step of transmitting the feature amount extraction data representing the feature amount as the partial data to the shared server.

Furthermore, the contents retrieval method of the present invention further includes a fifth receiving step, a second partial data formation step, and a fifth transmitting step in the shared server. The fifth receiving step receives a mail address of the second terminal device authorized to retrieve the shared contents from the first terminal device. The second partial data formation step forms partial data having a mail address in which the received mail address is added. The fifth transmitting step transmits the partial data having a mail address to the second terminal device corresponding to the mail address. The second receiving step may receive the partial data having a mail address as the partial data from the second terminal device.

BRIEF DESCRIPTION OF THE DRAWINGS

FIG. 5 shows specific examples of the corresponding relation between album ID and photograph ID of the contents retrieval system.

Figure 1:
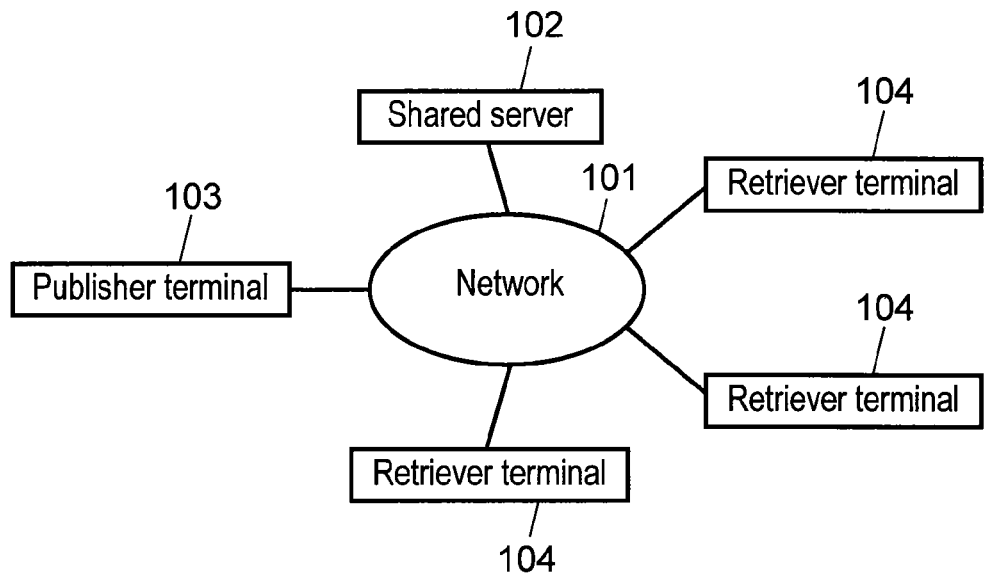
FIG. 1 is a block diagram showing a configuration of a contents retrieval system in accordance with a first exemplary embodiment of the present invention.

REFERENCE MARKS IN THE DRAWINGS 101 network
102, 102a, 102b, 102c shared server
103, 103a, 103b, 103c publisher terminal
104, 104a, 104b, 104c retriever terminal
201 transmitting and receiving section (network I/F)
202, 202b contents storage section (database DB)
203 contents retrieval section
204 partial data formation section
205 URL generation section
206 feature amount extracting section
211 contents area
212 partial data area
213 URL area
214 feature amount extraction data area
601, 602, 603 photograph album
604, 605, 606, 701, 704, 705 photograph data

DETAILED DESCRIPTION OF THE PREFERRED EMBODIMENT

Hereinafter, exemplary embodiments of a contents retrieval system in the present invention are described with reference to drawings. In the following description, unless otherwise noted, shared contents are a plurality of photograph data taken by a digital camera or a photograph album formed by grouping a plurality of photograph data.

First Exemplary Embodiment

FIG. 1 is a block diagram showing a configuration of a contents retrieval system in accordance with a first exemplary embodiment of the present invention. The contents retrieval system in accordance with this exemplary embodiment includes shared server 102, publisher terminal 103, and a plurality of retriever terminals 104, which are connected to network 101. Shared server 102 stores one or a plurality of shared contents. From publisher terminal 103 as a first terminal device, a publisher of contents sends shared contents to shared server 102. A plurality of retriever terminals 104 as second terminal devices retrieves the shared contents in shared server 102 and receives the retrieved shared contents. In general, network 101 is the Internet or a combined network of a cellular phone and the Internet. That is to say, publisher terminal 103 and a plurality of retriever terminals 104 are a personal computer or TV and a cellular phone having a function of connecting to the Internet, and the like.

The publisher of contents uploads a plurality of photograph data taken by the publisher himself/herself by using a digital camera to shared server 102 from publisher terminal 103 via network 101. Shared server 102 groups the plurality of received photograph data as photograph albums and stores them inside shared server 102. Each of a plurality of retrievers is connected to shared server 102 from retriever terminal 104 via network 101 and retrieves for a desired photograph album. When the corresponding photograph album is detected, each of the plurality of retrievers browses photographs in the photograph album or downloads them if necessary so as to receive them. Then, each of the plurality of retrievers stores the downloaded photographs inside the photograph album in his/her retriever terminal 104, and the like.

FIG. 1 shows three retriever terminals 104 as terminals for retrievers. In an actual system, however, the number of the retriever terminals is not limited to three. Furthermore, in the below-mentioned description, an operation of only one retriever terminal 104 as the retriever terminal is described. The operation is the same as in the other retriever terminals. Note here that only one publisher terminal 103 is shown, but in an actual system, the number of publisher terminal 103 is not limited to one.

Figure 2:
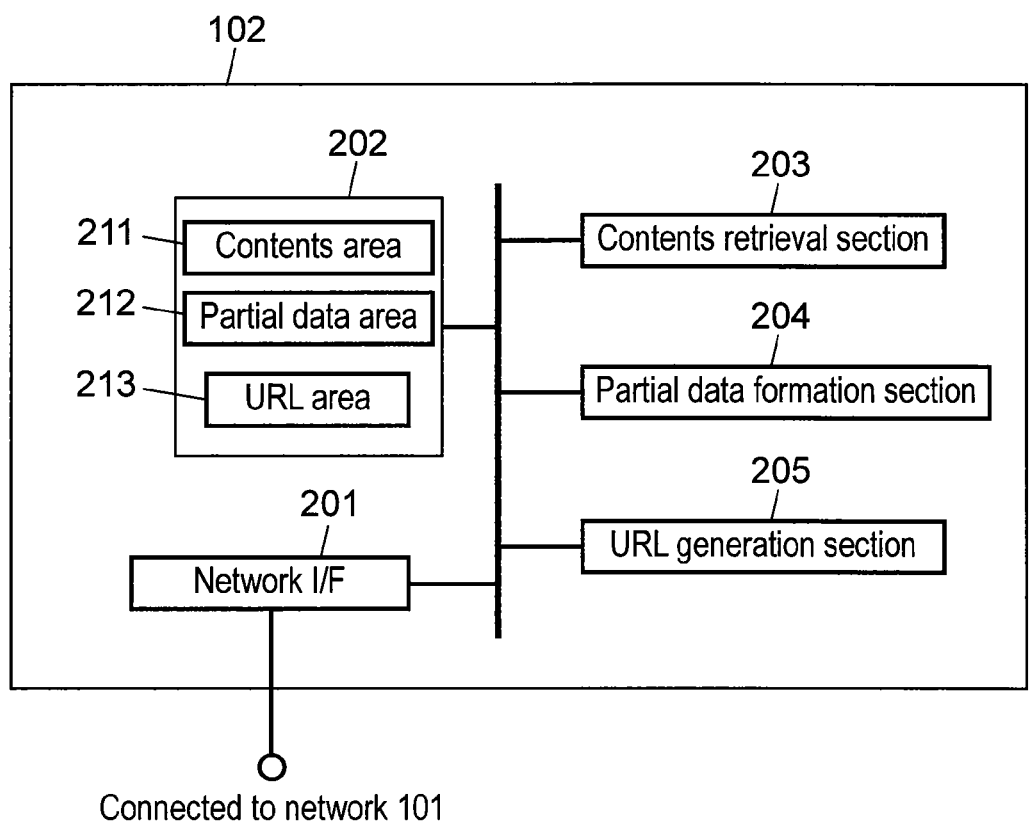
FIG. 2 a function block diagram showing an internal configuration of a shared server of the contents retrieval system.

FIG. 2 is a function block diagram showing an internal configuration of shared server 102 of the contents retrieval system in the first exemplary embodiment of the present invention. Note here that shared server 102 generally includes a personal computer or a workstation. Therefore, many of the function blocks shown in FIG. 2 are implemented by software. Consequently, shared server 102 does not necessarily have hardware corresponding to each function block.

Shared server 102 includes network interface (hereinafter, abbreviated as "network I/F") 201, contents database (hereinafter, abbreviated as "contents DB") 202, contents retrieval section 203, partial data formation section 204, and URL generation section 205.

Network I/F 201 as transmitting and receiving section transmits/receives data with respect to publisher terminal 103 and retriever terminal 104 via network 101.

Contents DB 202 as a contents storage section includes three areas, that is, contents area 211, partial data area 212, and URL area 213. Contents DB 202 receives shared contents transmitted from publisher terminal 103 via network I/F 201. Contents DB 202 stores the shared contents in contents area 211. Furthermore, contents DB 202 stores partial data formed by partial data formation section 204 in partial data area 212. Contents DB 202 stores URL generated by URL generation section 205 in URL area 213. Contents DB 202 stores the above-mentioned shared contents, partial data and URL as one unit of information in such a way that they are associated with each other.

Partial data formation section 204 forms partial data corresponding to the shared contents that have been received from publisher terminal 103 and stored. The partial data are used for authentication to access the shared contents. The partial data are stored in partial data area 212 in contents DB 202. Partial data formation section 204 transmits the partial data to publisher terminal 103 via network 101. Herein, when the shared contents are a plurality of photograph data, the partial data are, for example, one representative piece of photograph data in the plurality of photograph data.

URL generation section 205 generates a URL corresponding to shared contents. The URL specifies a storage place of the shared contents stored in contents area 211 in contents DB 202. Herein, the storage place is specified by, for example, a server name, a port number, a folder name, a file name, and the like. Then, URL generation section 205 stores this URL in URL area 213 in contents DB 202.

Contents retrieval section 203 retrieves the shared contents corresponding to partial data. An operation of contents retrieval section 203 is described. Firstly, shared server 102 receives partial data for authentication from retriever terminal 104. Then, contents retrieval section 203 retrieves the shared contents corresponding to the partial data, which are stored in contents area 211 as the contents storage section in association with the received partial data. When the relevant partial data are found, contents retrieval section 203 reads out a URL stored in association with the shared contents corresponding to the partial data from URL area 213. Then, contents retrieval section 203 allows network I/F 201 as the transmitting and receiving section to transmit the URL corresponding to the retrieved shared contents to retriever terminal 104. When shared server 102 receives and stores plural kinds of shared contents, partial data are formed with respect to each of the shared contents. Therefore, contents retrieval section 203 collates partial data received from retriever terminal 104 with a plurality of partial data in partial data area 212.

Figure 3:
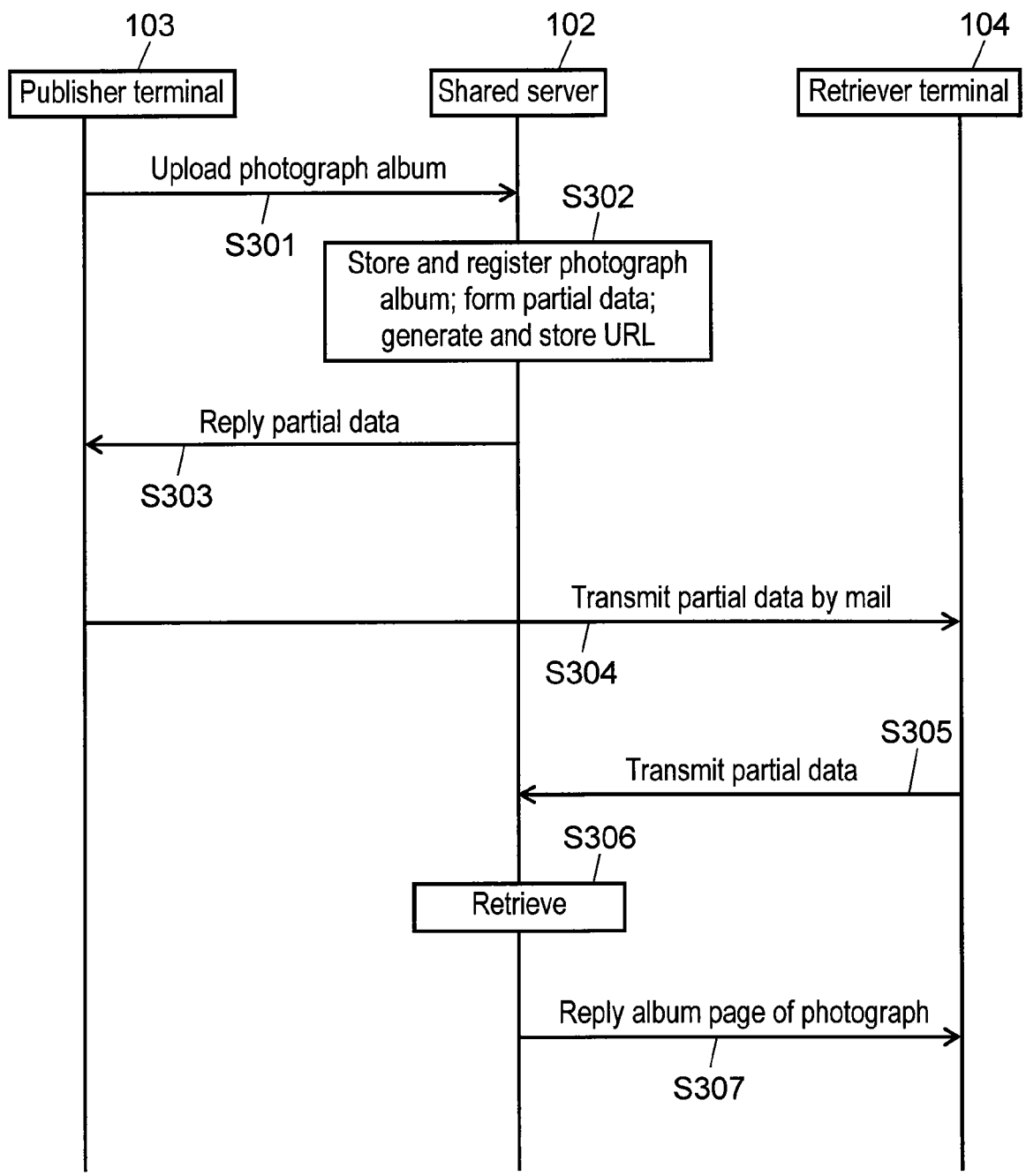
FIG. 3 is a sequence diagram showing a flow of data transmission and reception and processing in a shared server, a publisher terminal, and a retriever terminal, which constitute the contents retrieval system.

Next, an operation of the contents retrieval system in accordance with this exemplary embodiment is described. FIG. 3 is a sequence diagram showing the flow of transmission and reception of data and processing in shared server 102, publisher terminal 103, and retriever terminal 104, which constitute the contents retrieval system.

Firstly, publisher terminal 103 uploads a photograph album including a plurality of photograph data to shared server 102 (step S301). That is to say, in a first receiving step, shared server 102 receives shared contents from the first terminal device.

Next, in a first storing step, shared server 102 stores and registers the received photograph album including a plurality of photograph data in contents DB 202. Note here that a series of operations in which shared server 102 stores and registers the photograph album are described later in detail with reference to FIG. 4.

Then, shared server 102 forms partial data and URL associated with the received photograph album. That is to say, in a first partial data formation step, shared server 102 forms partial data corresponding to the received shared contents. Furthermore, in a URL formation step, shared server 102 forms a URL corresponding to the received shared contents.

Then, shared server 102 stores the formed partial data in partial data area 212, and stores the formed URL in URL area 213 (step S302). That is to say, step S302 is a second storing step in which shared server 102 stores the formed partial data and URL in shared server 102 in such a way that the partial data and URL are associated with the shared contents. An example of the partial data includes one representative piece of photograph data in the photograph album.

Next, step S303 is a replying step in which shared server 102 replies the partial data to publisher terminal 103 as the first terminal device. Specifically, this replying step can be also carried out in an operation screen as a response to the upload operation in step S301. Furthermore, shared server 102 may respond to the upload operation by mail to publisher terminal 103.

Next, publisher terminal 103 as the first terminal device transmits the partial data received from shared server 102 by, for example, mail transmission to retriever terminal 104 as the second terminal device authorized to retrieve and browse (step S304). When the partial data are photograph data, they may be transmitted as an attached file of mail. Step S304 is not necessarily carried out via network 101. Step S304 can be carried out by, for example, sending or handing a memory device (memory card) including partial data. That is to say, step S304 is a second transmitting step in which publisher terminal 103 as the first terminal device transmits the partial data received from shared server 102 in the above-mentioned replying step to retriever terminal 104 as the second terminal device authorized to retrieve and browse.

Next, retriever terminal 104 transmits the obtained partial data to shared server 102. Thus, retriever terminal 104 requests shared server 102 to retrieve a photograph album associated with the partial data (step S305). That is to say, step S305 is a second receiving step in which shared server 102 receives the partial data from retriever terminal 104 as the second terminal device. The transmission of the partial data can be carried out by uploading by an operation in a screen prepared for retrieving and browsing for the photograph album or by attaching a file to mail.

Shared server 102 retrieves for a photograph album associated with the partial data by using the received partial data (step S306). That is to say, step S306 is a retrieving step in which shared server 102 retrieves the shared contents corresponding to the received partial data. The retrieving can be easily carried out by checking whether or not the same partial data are stored in partial data area 212 as described in FIG. 2. When plural kinds of photograph albums are received and stored, partial data are formed with respect to each of the photograph albums. Therefore, contents retrieval section 203 can retrieve the relevant photograph album by collating the partial data received from retriever terminal 104 with a plurality of partial data in partial data area 212.

When the relevant photograph album is found, shared server 102 reads out a URL associated with the photograph album from URL area 213. Then, shared server 102 transmits a photograph album page linked to this URL to retriever terminal 104 (step S307). That is to say, step S307 is a first transmission step in which shared server 102 transmits the URL corresponding to the retrieved shared contents to retriever terminal 104 as the second terminal device. Also, a retriever may browse or download all or a part of photograph data included in the photograph album from the photograph album page so as to store them in retriever terminal 104.

Figure 4:
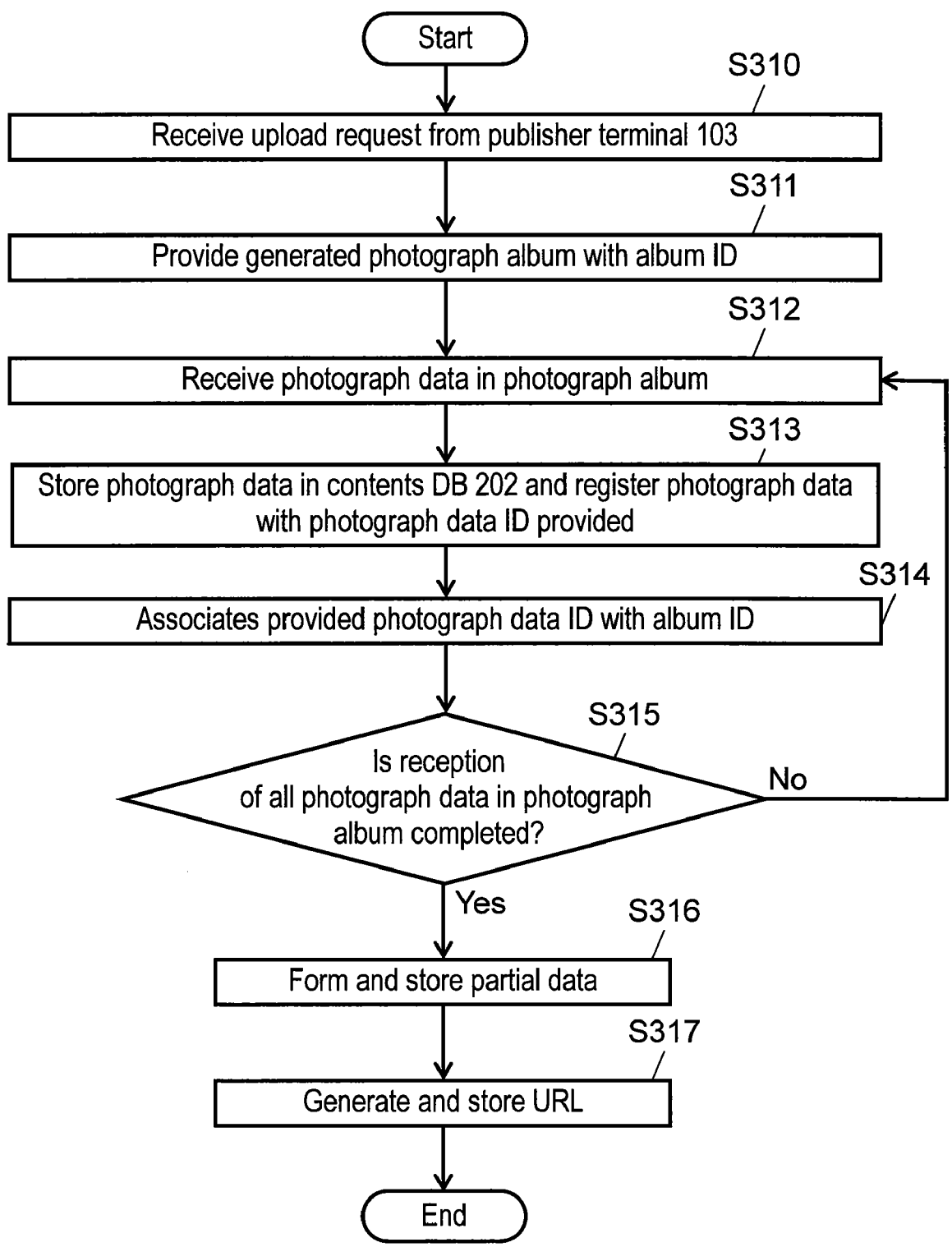
FIG. 4 is a flow chart showing that the shared server of the contents retrieval system receives a photograph album from the publisher terminal and registers it in a database.

Next, the operation flow of each of shared server 102, publisher terminal 103, and retriever terminal 104 is described. FIG. 4 is a flow chart showing that shared server 102 receives a photograph album from publisher terminal 103 and registers it in a database. FIG. 4 corresponds to the processing in step S302 of the sequence diagram shown in FIG. 3.

Firstly, shared server 102 receives an upload request of a photograph album from publisher terminal 103 (step S310). Then, shared server 102 provides the generated photograph album with an album ID (step S311). Thereafter, shared server 102 receives photograph data in the photograph album (step S312). Then, shared server 102 stores the photograph data in contents area 211 of contents DB 202 and registers the photograph data with photograph data ID provided (step S313). Next, shared server 102 associates album ID provided to the photograph album in step S311 with photograph data ID provided to the photograph data (step S314). This association is carried out by forming correspondence table of both IDs and the like.

Then, shared server 102 determines whether or not reception of all photograph data in the photograph album is completed (step S315). When the reception of all photograph data is completed ("Yes" in step S315), shared server 102 forms partial data corresponding to the photograph album and stores the formed partial data in partial data area 212 (step S316). Furthermore, shared server 102 generates a URL to access contents DB 202. Next, shared server 102 stores the generated URL in such a way that the URL is associated with the shared contents (step S317). Then, a series of processing is completed. On the other hand, when the reception is not completed in step S315 (in the case of "No"), the processing returns to step S312 and continues the reception of photograph data.

FIG. 5 shows specific examples of the corresponding relation between the album ID and the photograph ID. As shown in FIG. 5, for example, when photograph albums 601, 602, and 603 are uploaded in shared server 102, shared server 102 provides these three photograph albums 601, 602 and 603 with album A, album B and album C as album ID, respectively. Shared server 102 provides four photograph data 604 included in photograph album 601 with A001-A004 as photograph data ID. Furthermore, shared server 102 provides five photograph data 605 included in photograph album 602 with B001-B005 as photograph data ID. In addition, shared server 102 provides six photograph data 606 included in photograph album 603 with C001-C006 as photograph data ID. In contents DB 202, the album ID of photograph album and photograph data ID are associated with each other. Therefore, in contents DB 202, when album ID is designated, all photograph data ID included in the photograph album can be specified. On the contrary, in contents DB 202, when one photograph data ID is designated, a photograph album to which the photograph data belong can be specified.

As mentioned above, contents DB 202 forms an ID correspondence table for associating a photograph data ID with an album ID. Therefore, in contents DB 202, retrieving of a photograph album from photograph data can be carried out by using the ID correspondence table. That is to say, the shared contents are a photograph album including a plurality of photograph data, and the partial data may be at least a certain piece of specific photograph data in the photograph album. Specifically, the partial data are photograph data each of which are provided with photograph data ID. For example, photograph data ID are A001-A004, B001-B005 and C001-C006.

Therefore, for example, when the partial data are one piece of photograph data in photograph album 605 provided with B001 as the photograph data ID, shared server 102 can specify photograph data ID based on one piece of photograph data as the partial data. Then, shared server 102 can specify album ID associated with photograph data ID as album B. As a result, shared server 102 can specify photograph album 602 based on album ID.

Figure 6:
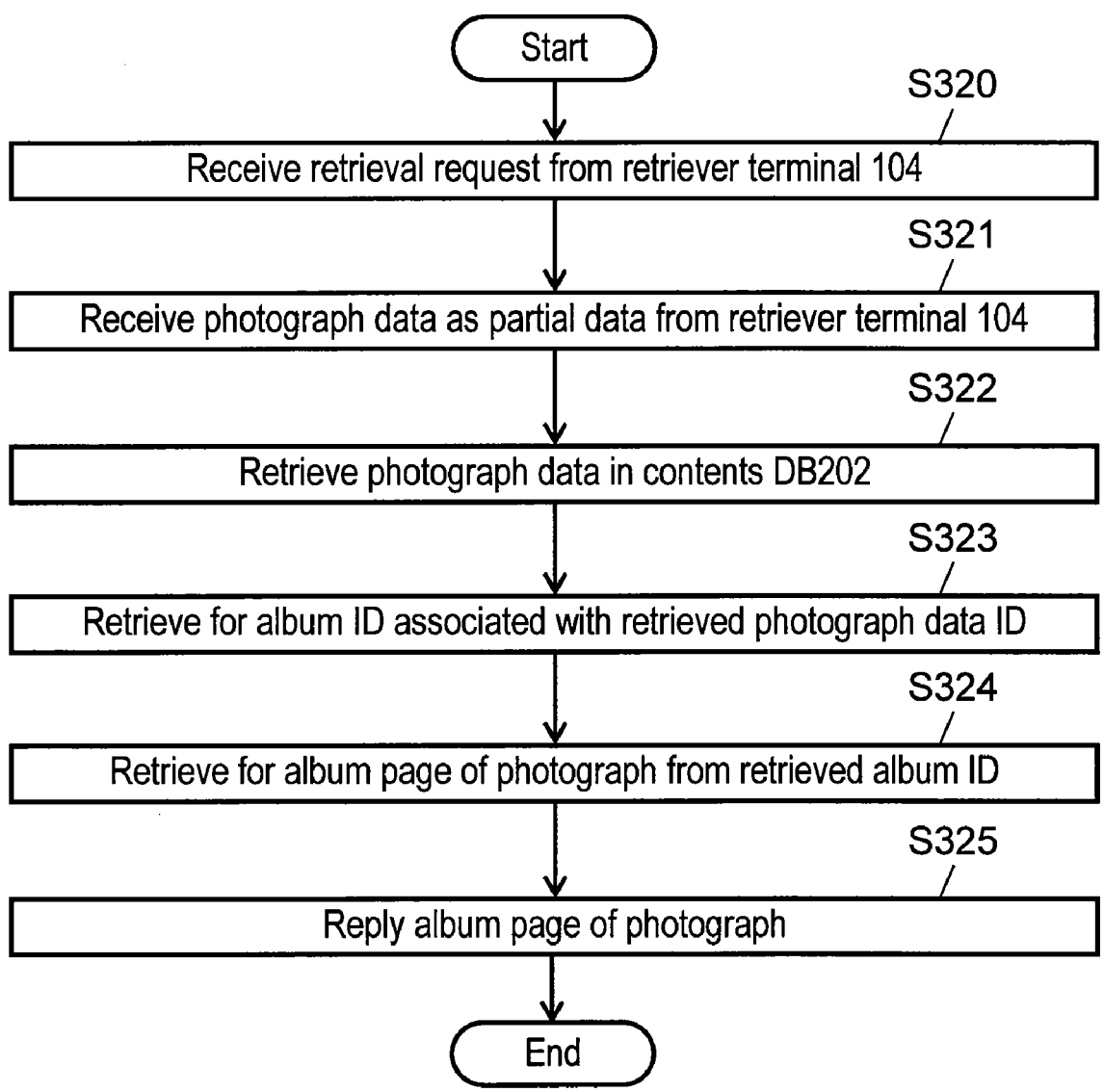
FIG. 6 is a flow chart showing that the shared server of the contents retrieval system receives partial data specifying a photograph album from the retriever terminal and replies an album page of the photograph to the retriever terminal.

FIG. 6 is a flow chart showing that shared server 102 receives photograph data as partial data for specifying a photograph album from retriever terminal 104 and replies an album page of the photograph to retriever terminal 104. FIG. 6 corresponds to the processing shown in step S305 to step S307 in FIG. 3.

Firstly, shared server 102 receives a retrieval request from retriever terminal 104 (step S320). Step S320 is specifically carried out when a retriever accesses a URL that designates the shared server as a site of a photograph album service from retriever terminal 104 and selects a command and the like. Thus, shared server 102 receives partial data from retriever terminal 104 (step S321). Then, shared server 102 retrieves for photograph data as the partial data by comparison with the partial data stored in partial data area 212 of contents DB 202 (step S322). When the photograph data are found, shared server 102 retrieves for an album ID by the ID correspondence table based on the photograph data ID (step S323). Next, shared server 102 retrieves for the album page from the retrieved album ID (step S324). Finally, shared server 102 transmits the retrieved album page to retriever terminal 104 (step S325). Then, a series of processing is ended. Note here that the URL as the album page is generated in shared server 102 at the time when the shared contents are received. It may be generated based on the album ID retrieved at the time when the partial data are received.

Figure 7:
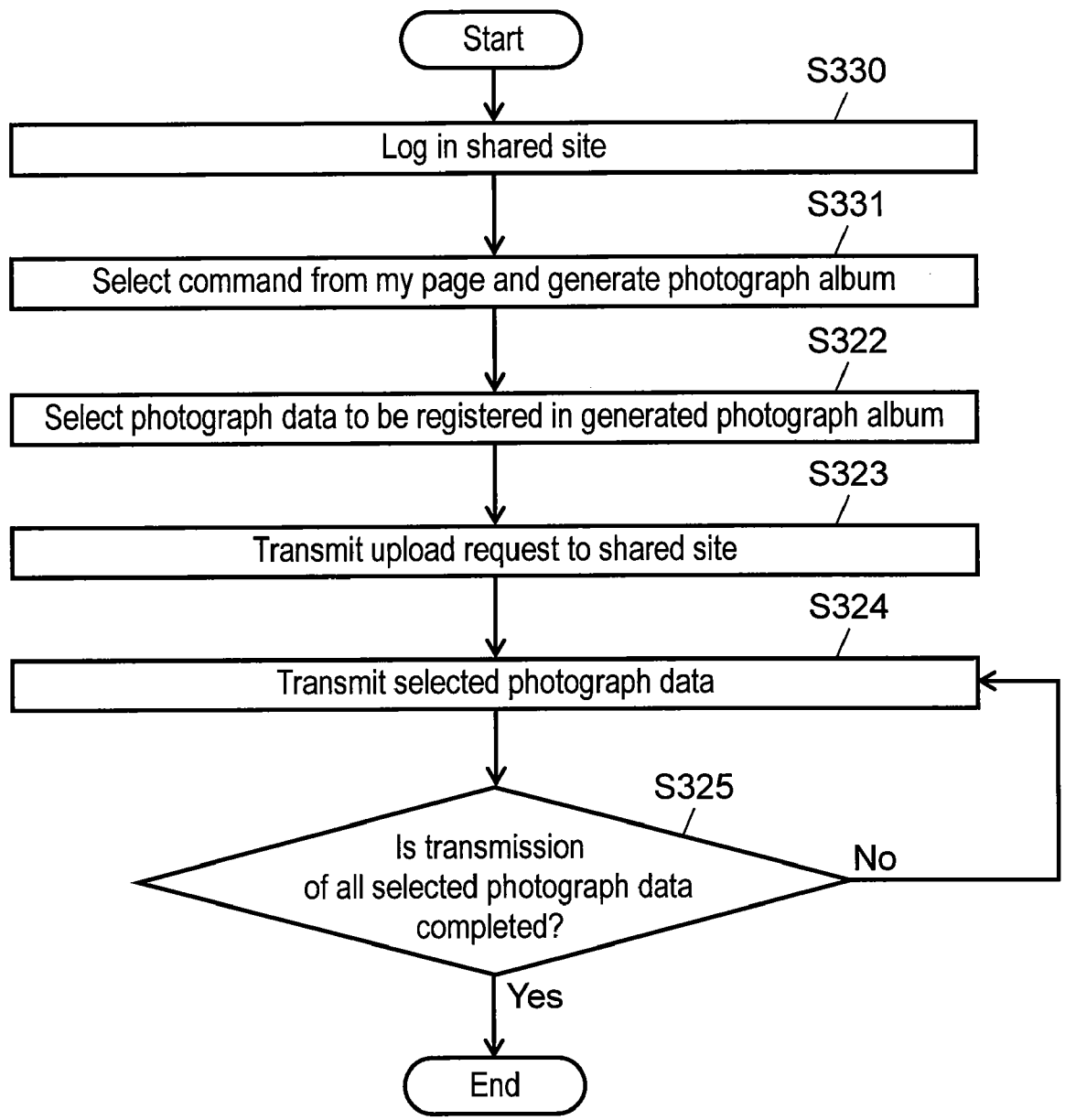
FIG. 7 is a flow chart showing processing in which a publisher terminal of the contents retrieval system uploads a photograph album to the shared server.

Next, processing of publisher terminal 103 is described. FIG. 7 is a flow chart showing processing in which publisher terminal 103 uploads a photograph album to shared server 102. A publisher logs in shared server 102 as a shared site from publisher terminal 103 (step S330). User ID, password, and the like, for logging in are registered in shared server 102 in advance.

Next, the publisher selects a command from my page prepared for every user who logs in, and generates a photograph album (step S331). Then, the publisher selects the photograph data to be registered in the generated photograph album in publisher terminal 103 (step S322). Thereafter, the publisher transmits an upload request to shared server 102 (step S323). When the upload request is accepted, the selected photograph data are transmitted to shared server 102 (step S324). Next, the publisher determines whether or not transmission of all photograph data selected in step S322 is completed (step S325). When the transmission is completed (in the case of "Yes"), a series of processing is ended. On the other hand, when the transmission of the photograph data is not completed (in the case of "No"), the processing returns to step S324 and continues the transmission.

Figure 8:
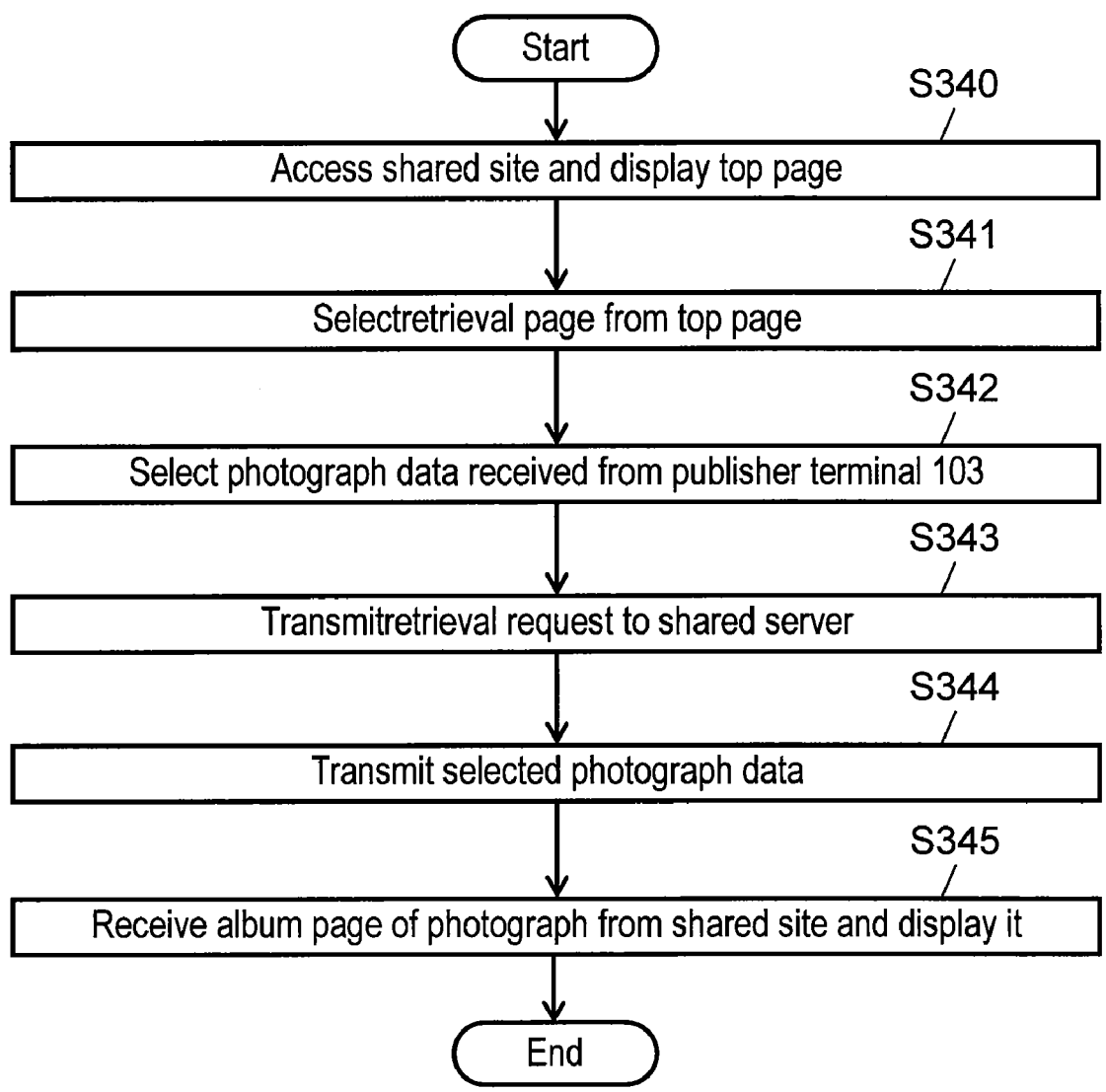
FIG. 8 is a flow chart showing processing in which a retriever terminal of the contents retrieval system receives an album page of a photograph from the shared server.

Next, processing of retriever terminal 104 is described. FIG. 8 is a flow chart showing processing in which retriever terminal 104 receives an album page of a photograph from shared server 102. Firstly, retriever terminal 104 accesses shared server 102 and displays a top page (step S340), and then selects a retrieval page of a photograph album from the top page (step S341). Next, retriever terminal 104 selects photograph data as the partial data, which have been received from publisher terminal 103 in advance and stored in the hard disk and the like (step S342). Thereafter, retriever terminal 104 transmits a retrieval request to shared server 102 (step S343). Next, when the retrieval request is accepted, retriever terminal 104 transmits the selected photograph data (step S344). Finally, retriever terminal 104 receives and displays an album page from shared server 102 as the shared site (step S345). Thus, a series of processing is ended.

Figure 9:
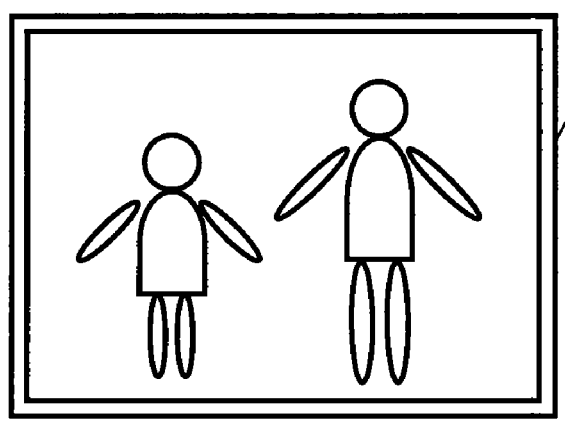
FIG. 9 is an image view showing an example of a received screen of mail for transmitting partial data from the publisher terminal to the retriever terminal.

FIG. 9 is an image view showing an example of a received screen of mail for transmitting partial data from publisher terminal 103 to retriever terminal 104 in step S304 shown in FIG. 3. One piece of photograph data 701 in the photograph album as partial data is transmitted as an attached file (displayed as Party-06.jpg in FIG. 9) of the mail. A retriever who receives the photograph can confirm the photograph, so that the retriever can imagine the contents of the photograph album easily.

Figure 10:
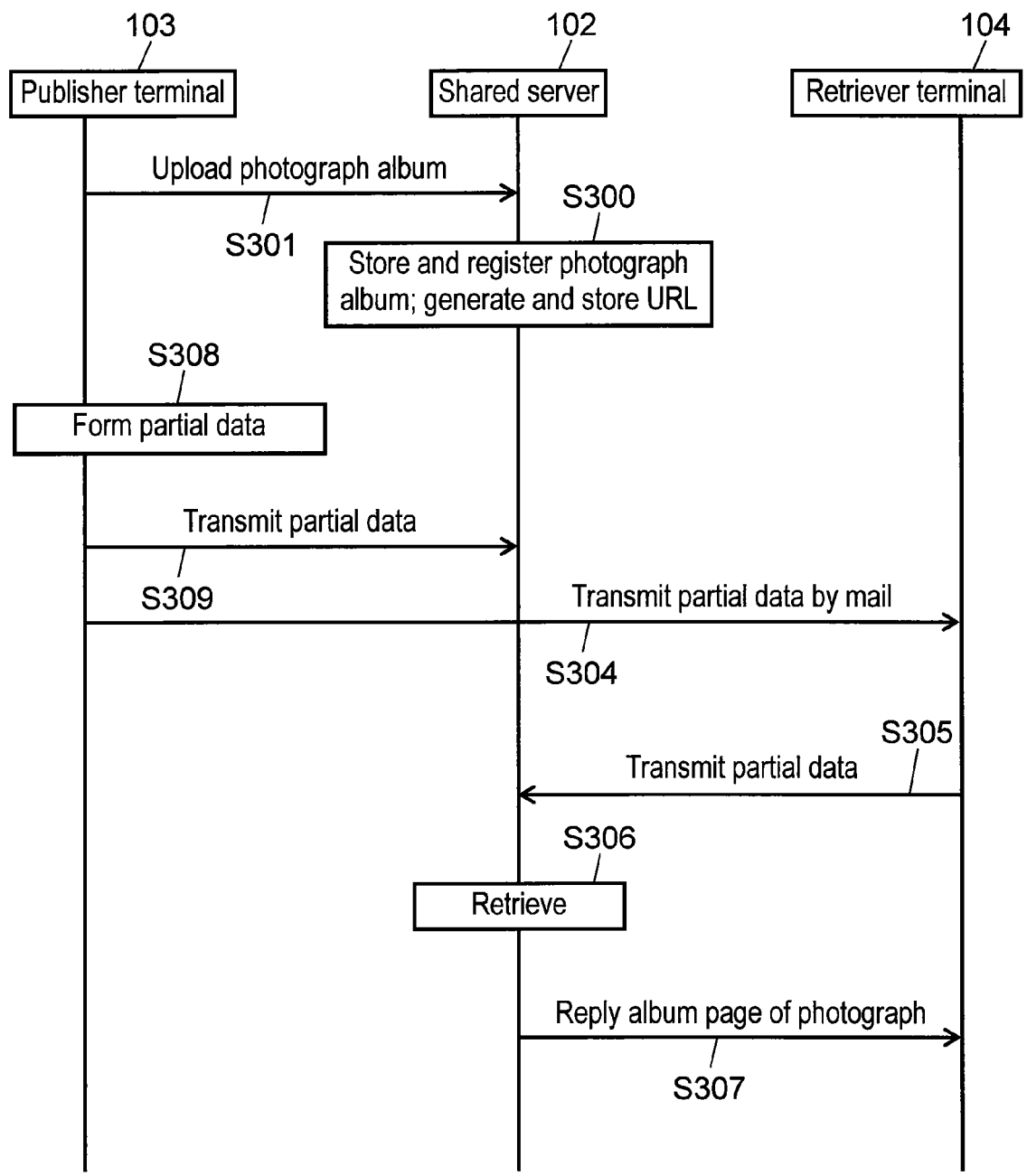
FIG. 10 is a sequence diagram showing the flow of transmission and reception of data and processing in a shared server, a publisher terminal, and a retriever terminal, which constitute another example of a contents retrieval system in accordance with the first exemplary embodiment of the present invention.
Figure 11:
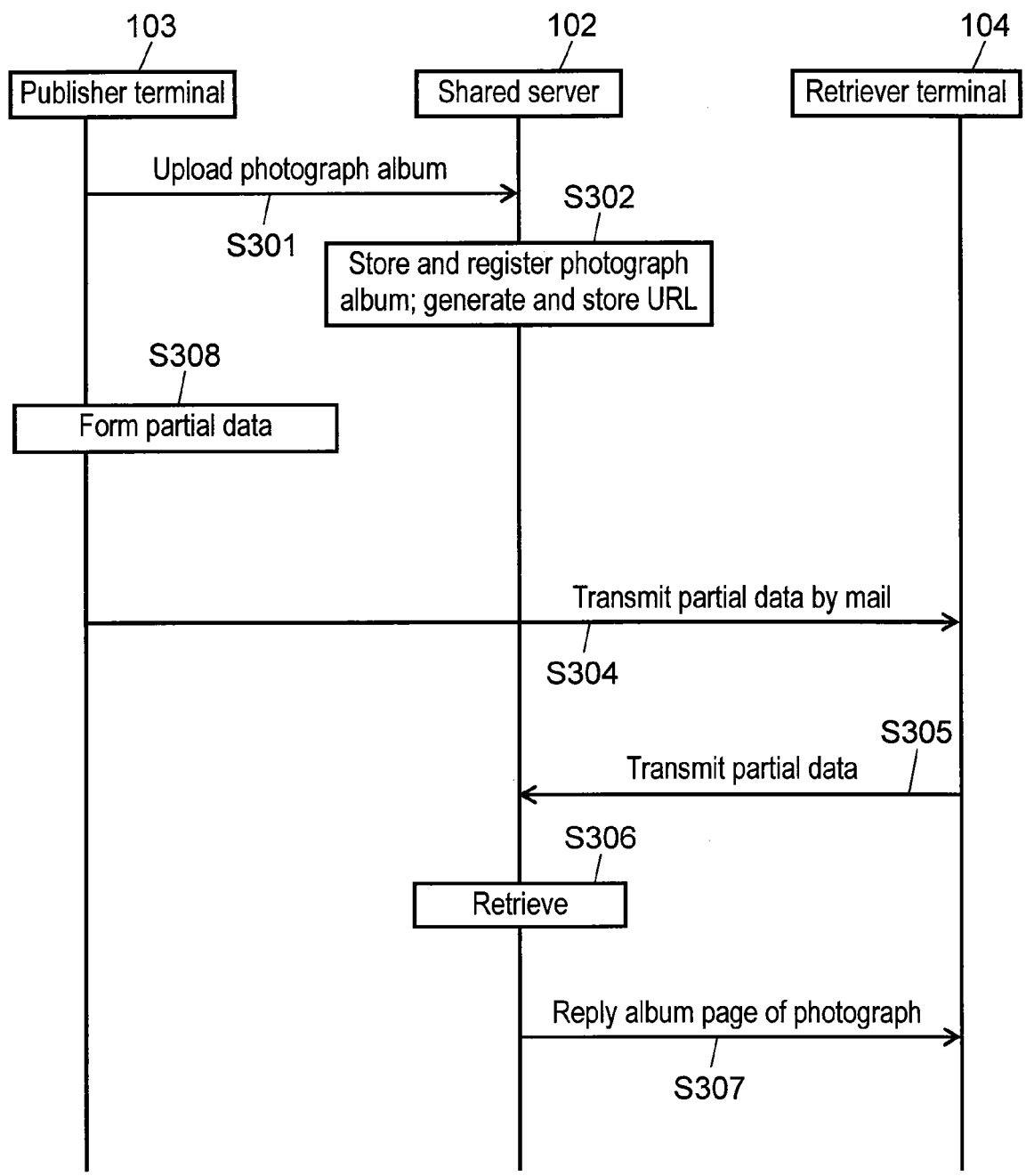
FIG. 11 is a sequence diagram showing the flow of transmission and reception of data and processing in a shared server, a publisher terminal, and a retriever terminal, which constitute a further example of a contents retrieval system in accordance with the first exemplary embodiment of the present invention.

Note here that in the above-mentioned exemplary embodiment, shared server 102 forms partial data, publisher terminal 103 receives the partial data and transmits the partial data to retriever terminal 104. However, as shown in FIG. 10 or 11, formation of the partial data may be carried out at the side of publisher terminal 103 (step S308). FIGS. 10 and 11 are different from FIG. 3 only in step S300 and step S308. Since the other steps are the same as each other, the description of the same steps is omitted. In step S300, the operation of shared server 102 does not include the formation of partial data as compared with the operation shown in FIG. 3, and publisher terminal 103 forms partial data (step S308). When a certain photograph in the photograph album is selected as the partial data, it is not necessary that the partial data are not purposely formed in shared server 102. In this case, publisher terminal 103 transmits the partial data formed by the publisher himself/herself to both shared server 102 and retriever terminal 104.

FIG. 10 is a sequence diagram showing the flow of transmission and reception of data and processing in shared server 102, publisher terminal 103, and retriever terminal 104, which constitute another example of a contents retrieval system in accordance with the first exemplary embodiment of the present invention. As shown in FIG. 10, in this example, publisher terminal 103 forms partial data and then transmits the partial data to both shared server 102 and retriever terminal 104 (step S309 and step S304). In this example, by the similar procedure shown in FIG. 3, when shared server 102 receives partial data transmitted from retriever terminal 104 in step 305, retrieving of a photograph album becomes possible (step 306).

FIG. 11 is a sequence diagram showing the flow of transmission and reception of data and processing in shared server 102, publisher terminal 103, and retriever terminal 104, which constitute a further example of a contents retrieval system in accordance with the first exemplary embodiment of the present invention. As shown in FIG. 11, publisher terminal 103 may transmit partial data to only retriever terminal 104 (S304). In this case, shared server 102 cannot grasp what has been selected as the partial data. However, in step S305, shared server 102 receives partial data from retriever terminal 104 and retrieves whether or not the designated partial data are included in the photograph album held by shared server 102, and thereby shared server 102 can determine whether or not the relevant photograph album exists (S306). That is to say, publisher terminal 103 as the first terminal device forms partial data of the shared contents, and may transmit the partial data to both shared server 102 and retriever terminal 104 as the second terminal device or to only the first terminal device.

Furthermore, the above-mentioned exemplary embodiment describes an example of one piece of photograph data showing an entire image of one photograph data as the partial data of the photograph album. As the partial data, for example, thumbnail whose image size is reduced may be employed. Furthermore, as the photograph data of the photograph album, photograph data taken by the publisher of contents by using a digital camera are used. However, the photograph data are not limited to this example and photograph data formed by converting photograph taken, for example, a film-based camera into digital data by using digital equipment may be used. That is to say, the data may not be limited to photograph, data may be one obtained by subjecting paper information such as memorandum on notebook and facsimile to electronic data processing. However, data disturbing public order and morals, data violating the copy right and the right of portrait of others are not desired.

Furthermore, in the description of the above-mentioned exemplary embodiment, an example of the shared contents is a photograph album including a plurality of photograph data. However, moving image data taken by digital video camera may be treated as the shared contents. As the partial data in this case, one frame of still picture data taken out of the moving image data may be used or several seconds portion of moving image data may be used.

Note here that the shared contents may not be limited to one taken by a digital video camera as long as the data are digitalized moving image data. For example, digitalized moving image data can be also formed by using a digital camera. Furthermore, the present invention can be applied to digitalized data by digitalizing moving image data by a conventional analog signal.

That is to say, the shared contents may be moving image data and the partial data may be at least a certain frame of moving data in the moving image data.

Second Exemplary Embodiment

Figure 12:
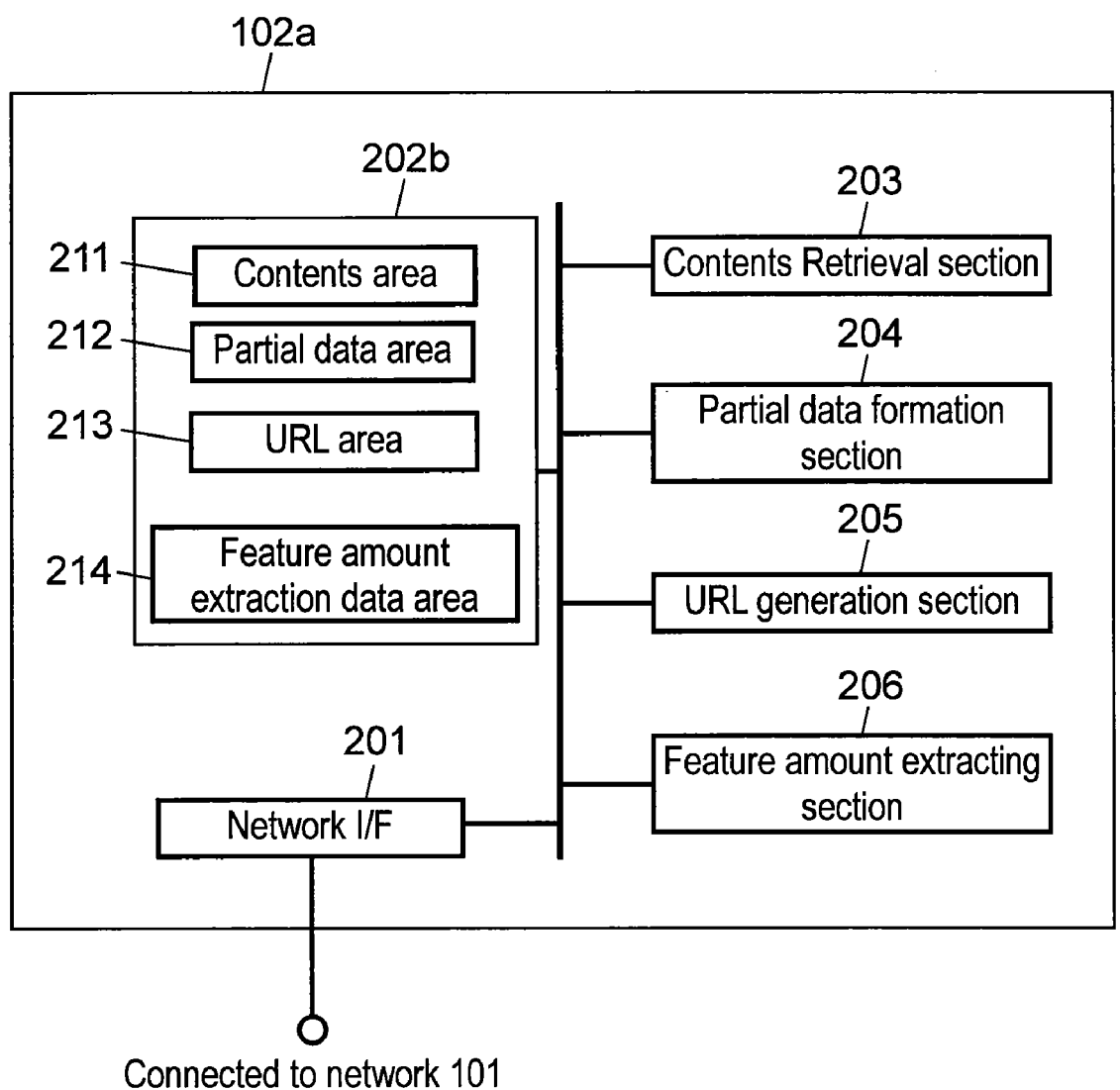
FIG. 12 is a function block diagram showing an internal configuration of a shared server of a contents retrieval system in accordance with a second exemplary embodiment of the present invention.
Figure 13:
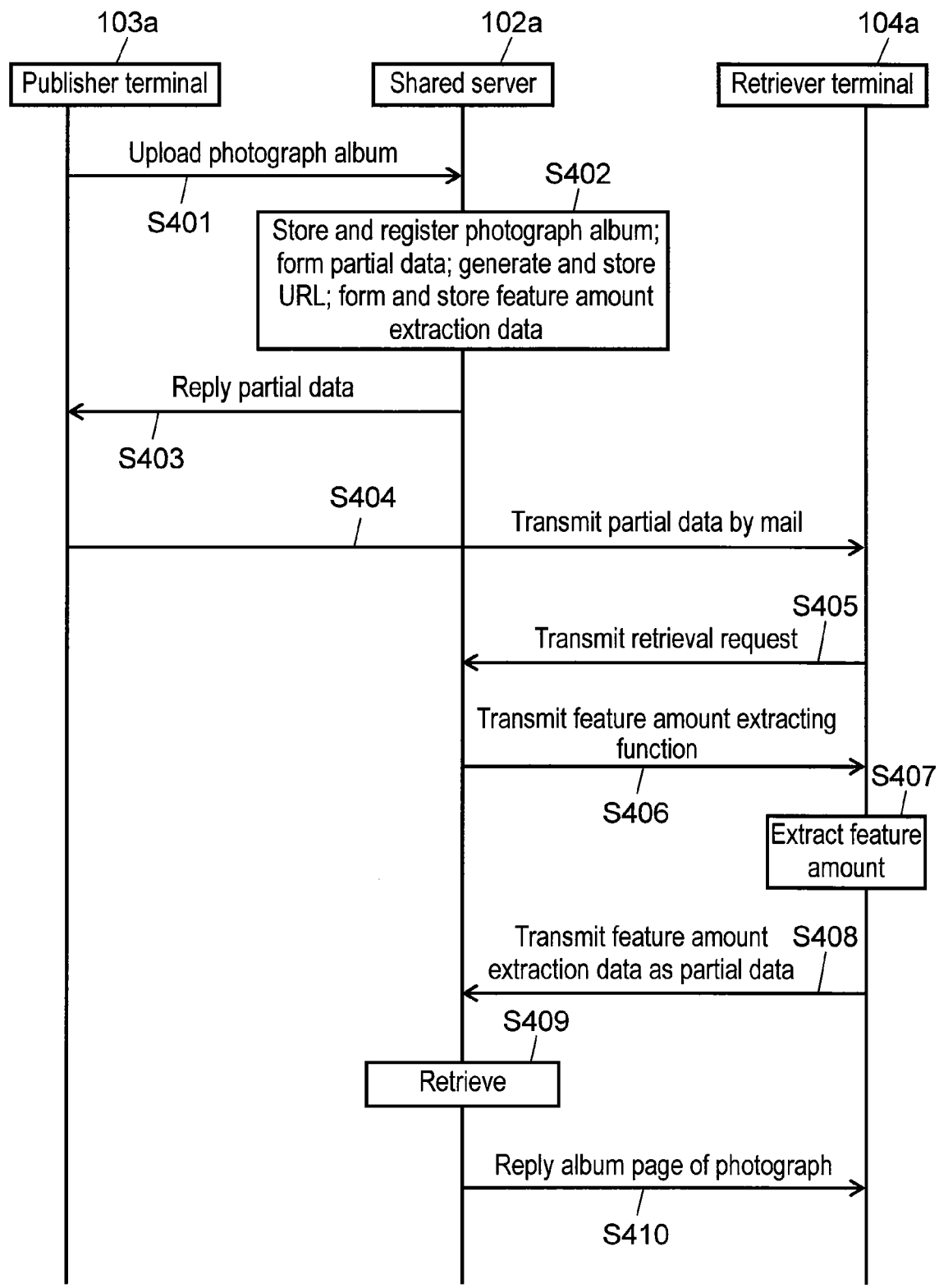
FIG. 13 is a sequence diagram showing the flow of transmission and reception of data and processing when shared contents are retrieved by using feature amount extraction data in the contents retrieval system.

FIG. 12 is a function block diagram showing an internal configuration of shared server 102a of a contents retrieval system in accordance with a second exemplary embodiment of the present invention. FIG. 13 is a sequence diagram showing the flow of transmission and reception of data and processing when shared contents are retrieved by using feature amount extraction data. The block diagram showing the configuration of the contents retrieval system in accordance with this exemplary embodiment is the same as FIG. 1 in the first exemplary embodiment. Although the configuration is not shown, the contents retrieval system in accordance with this exemplary embodiment includes shared server 102a, publisher terminal 103a, and a plurality of retriever terminals 104a, which are connected to network 101. Hereinafter, the same reference numerals are given to the same components as those in the first exemplary embodiment and description thereof is omitted.

In the first exemplary embodiment, retrieval processing in shared server 102 is carried out by collation of one piece of photograph data as partial data. That is to say, partial data received from retriever terminal 104 and partial data stored in partial data area 212 are compared and collated with each other. With the recent increase in the number of pixels of a digital camera, it is not uncommon that the capacity of one piece of photograph data is about 1 MB even in the data after JPEG compression. Due to the increase in the number of photograph albums to be treated in shared server 102 or the increase in the number of retrievers, retrieving processing of partial data with such a large size leads to increase in burden of process of shared server 102 and increase in retrieving time. Furthermore, when photograph data themselves are used as partial data, when the partial data are transmitted to others with whom the data are not desired to be shared, the photograph album may be browsed easily by such persons. This is not preferable in terms of security.

Then, in the contents retrieval system in accordance with the second exemplary embodiment of the present invention, as data for retrieving, feature amount extraction data from certain photograph data are used instead of partial data, that is, certain photograph data themselves.

Shared server 102a of the contents retrieval system in accordance with this exemplary embodiment is different from shared server 102 shown in FIG. 2 in the following two points. One point is that feature amount extracting section 206 for receiving an input of partial data obtained in partial data formation section 204 and extracting the feature amount thereof is additionally provided. Another point is that feature amount extraction data area 214 as a software storage section is additionally provided inside contents DB 202b. Feature amount extraction data area 214 also stores software for executing a feature amount extracting function. Shared server 102a detects whether or not the relevant photograph album is present by collating feature amount extraction data transmitted at the time of retrieving from retriever terminal 104a (shown in FIG. 13) with feature amount extraction data stored in feature amount extraction data area 214.

Next, one example of an operation in which shared server 102a extracts a feature amount from partial data, that is, certain photograph data is described. In general, in the photograph data taken by a digital camera, not only taken image data but also metadata are recorded based on the file standard called EXIF (Exchangeable Image File Format). An example of the metadata includes a photographing date of the photographed image, photographing conditions such as an aperture and a shutter speed, or a device name of photographing camera, and the like. Shared server 102a may extract such metadata and use them as feature amount extraction data of the original photograph data.

An example of another operation for extracting a feature amount includes extraction of histogram, contour data and the like, showing luminance distribution in the image. Thus, when some feature amount extraction data are extracted from the original photograph data and used, as compared with the case where the original photograph data are used, the information amount for communication via network 101 is significantly reduced. Since the information amount is reduced, it cannot be denied that different original photographs may provide the same feature amount extraction data. However, in the network photograph album in accordance with the present invention, such a coincidence can be practically negligible.

Next, the flow of transmission and reception of data and processing when shared contents are retrieved by using feature amount extraction data in the contents retrieval system in accordance with this exemplary embodiment is described. As shown in FIG. 13, firstly, similar to FIG. 3, publisher terminal 103a uploads a photograph album including a plurality of photograph data to shared server 102a (step S401).

Next, shared server 102a stores and registers the received photograph album including a plurality of photograph data in contents DB 202b. Then, shared server 102a forms partial data and URL associated with the received photograph album. Next, shared server 102a stores the formed partial data in partial data area 212. Furthermore, shared server 102a stores the formed URL in URL area 213. Then, shared server 102a forms and stores partial data and URL associated with the received photograph album as well as feature amount extraction data extracted from the partial data (step S402). That is to say, step S402 is a feature extraction step in which the shared server extracts and stores a feature amount of the partial data. Thereafter, shared server 102a replies only the partial data to publisher terminal 103a (step S403). Publisher terminal 103a transmits partial data to retriever terminal 104a authorized to retrieve and browse by mail (step S404).

Retriever terminal 104a transmits a retrieval request to shared server 102a before retriever terminal starts retrieving actually (step S405). That is to say, step S405 is a third receiving step in which shared server 102a receives a contents retrieval request from retriever terminal 104a as the second terminal device. In response to this, shared server 102a transmits software for executing a feature amount extracting function to retriever terminal 104a as the second terminal device (step S406). That is to say, step S406 is a third transmission step in which shared server 102a transmits execution software for extracting a feature amount to the second terminal device when shared server 102a receives a contents retrieval request. Retriever terminal 104a extracts feature from the previously obtained partial data by using the feature amount extracting function by this software (step S407). That is to say, step S407 is a second feature extraction step in which retriever terminal 104a as the second terminal device extracts a features amount from partial data by using a feature amount extracting function by execution software.

Thereafter, retriever terminal 104a transmits the feature amount extraction data as partial data to shared server 102a for retrieving (step S408). That is to say, step S408 is a fourth transmission step in which retriever terminal 104a transmits feature amount extraction data representing the feature amount as partial data to the shared server. Then, step S409 is a retrieving step in which shared server 102a carries out retrieving by collating the feature amount extraction data previously obtained and stored in step S402 and the feature amount extraction data received from retriever terminal 104a with each other.

When the relevant photograph album is found, shared server 102a reads out URL associated with the photograph album from URL area 213. Then, shared server 102a transmits an album page of photograph linked to the URL to retriever terminal 104a (step S410). The retriever can browse all or a part of photograph album from this album page or can download it in retriever terminal 104a.

Next, the operation flow of shared server 102a and retriever terminal 104a is described. Since the processing of publisher terminal 103a is the same as in the first exemplary embodiment, the description thereof is omitted.

Figure 14:
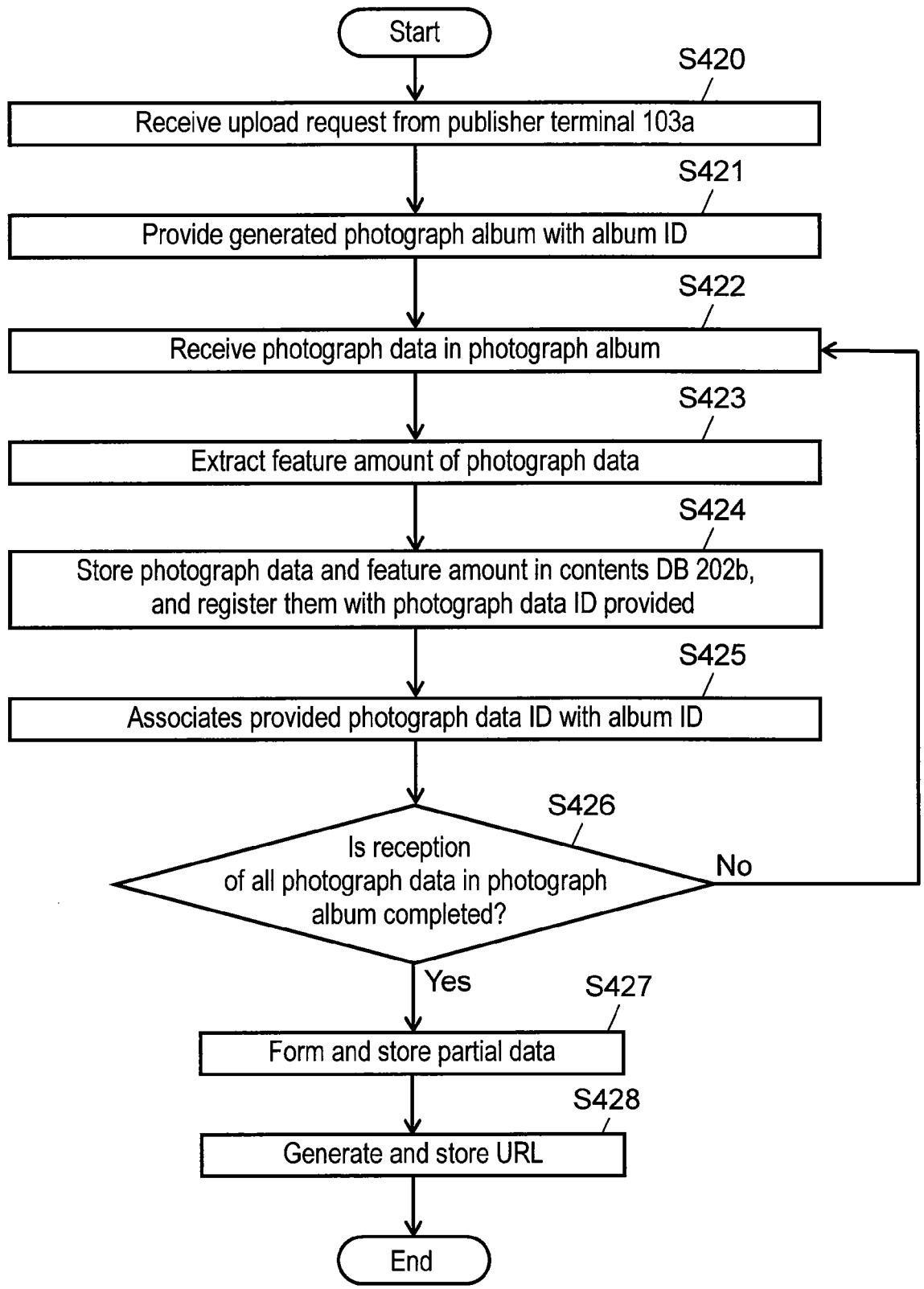
FIG. 14 is a flow chart showing that the shared server of the contents retrieval system receives a photograph album from the publisher terminal and registers it in the contents DB.

FIG. 14 is a flow chart showing that shared server 102a receives a photograph album from publisher terminal 103a and registers it in contents DB 202b in the contents retrieval system in accordance with the second exemplary embodiment of the present invention. This processing flow is different from the processing flow in the first exemplary embodiment shown in FIG. 4 in steps S420, S423, and S424. In step S420, shared server 102a receives an upload request from publisher terminal 103c. In step S423, shared server 102a extracts a feature amount of photograph data. In the subsequent step S424, shared server 102a stores the photograph data and the feature amount in feature amount extraction data area 214 of contents DB 202b and provides photograph ID. Since other processing is the same as in the processing flow in the first exemplary embodiment, the description thereof is omitted.

Figure 15:
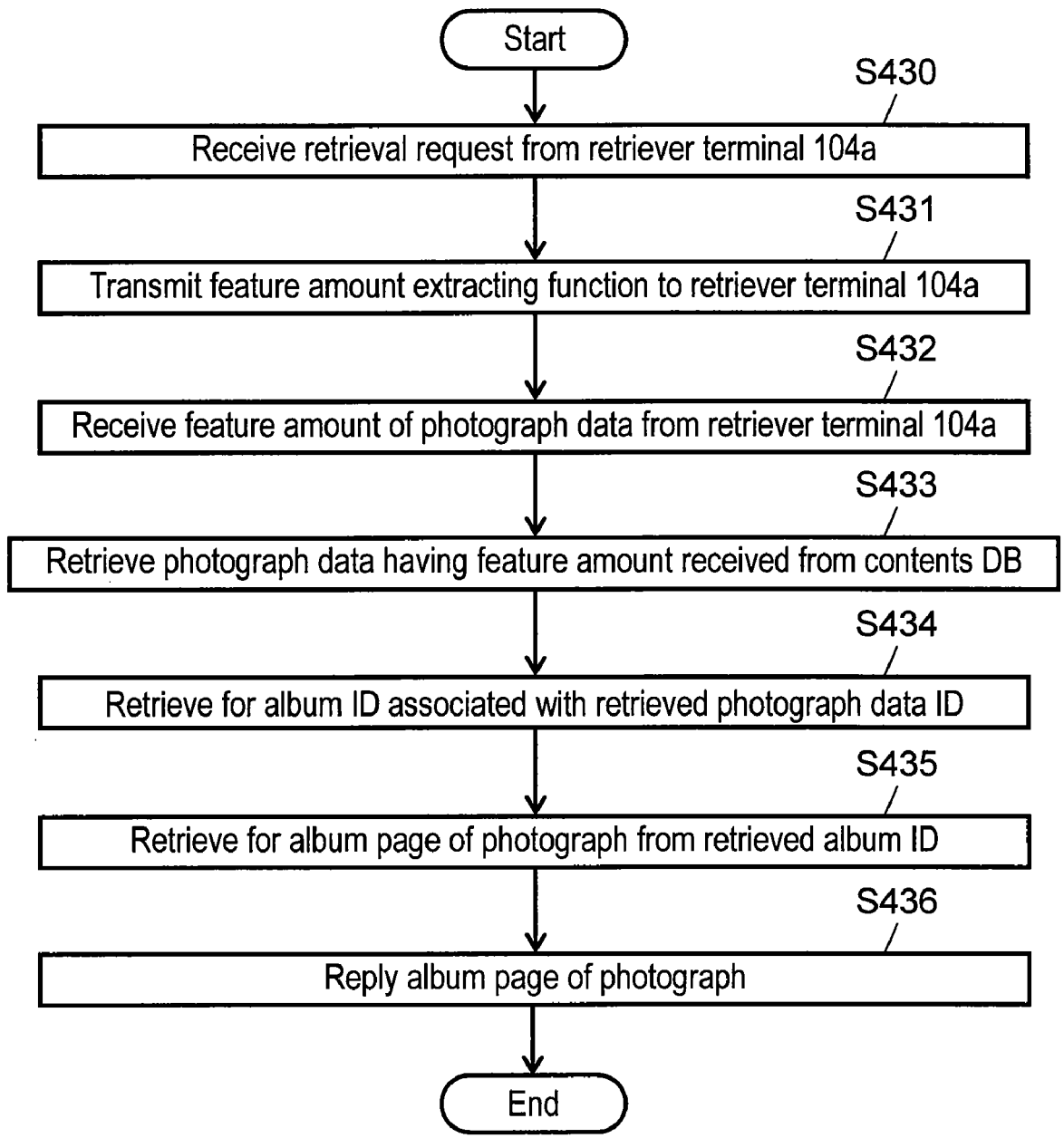
FIG. 15 is a flow chart showing that the shared server of the contents retrieval system receives a retrieval request from the retriever terminal and replies an album page of the generated photograph.

FIG. 15 is a flow chart showing that shared server 102a of the contents retrieval system receives a retrieval request from retriever terminal 104a and replies an album page of the generated photograph in accordance with the second exemplary embodiment of the present invention. Firstly, shared server 102a receives a retrieval request from retriever terminal 104a (step S430). Next, shared server 102a transmits software for executing a feature amount extracting function to retriever terminal 104a (step S431). Thereafter, shared server 102a receives a feature amount of photograph data from retriever terminal 104a (step S432). Next, shared server 102a retrieves for photograph data having the received feature amount from contents DB 202b (step S433). When photograph data having the feature amount is found, shared server 102a further retrieves for an album ID associated with the retrieved photograph data ID (step S434). Next, shared server 102a retrieves for an album page of photograph from the retrieved album ID (step S435). Shared server 102a transmits the finally retrieved album page to retriever terminal 104a (step S436). Thus, a series of processing is ended.

Figure 16:
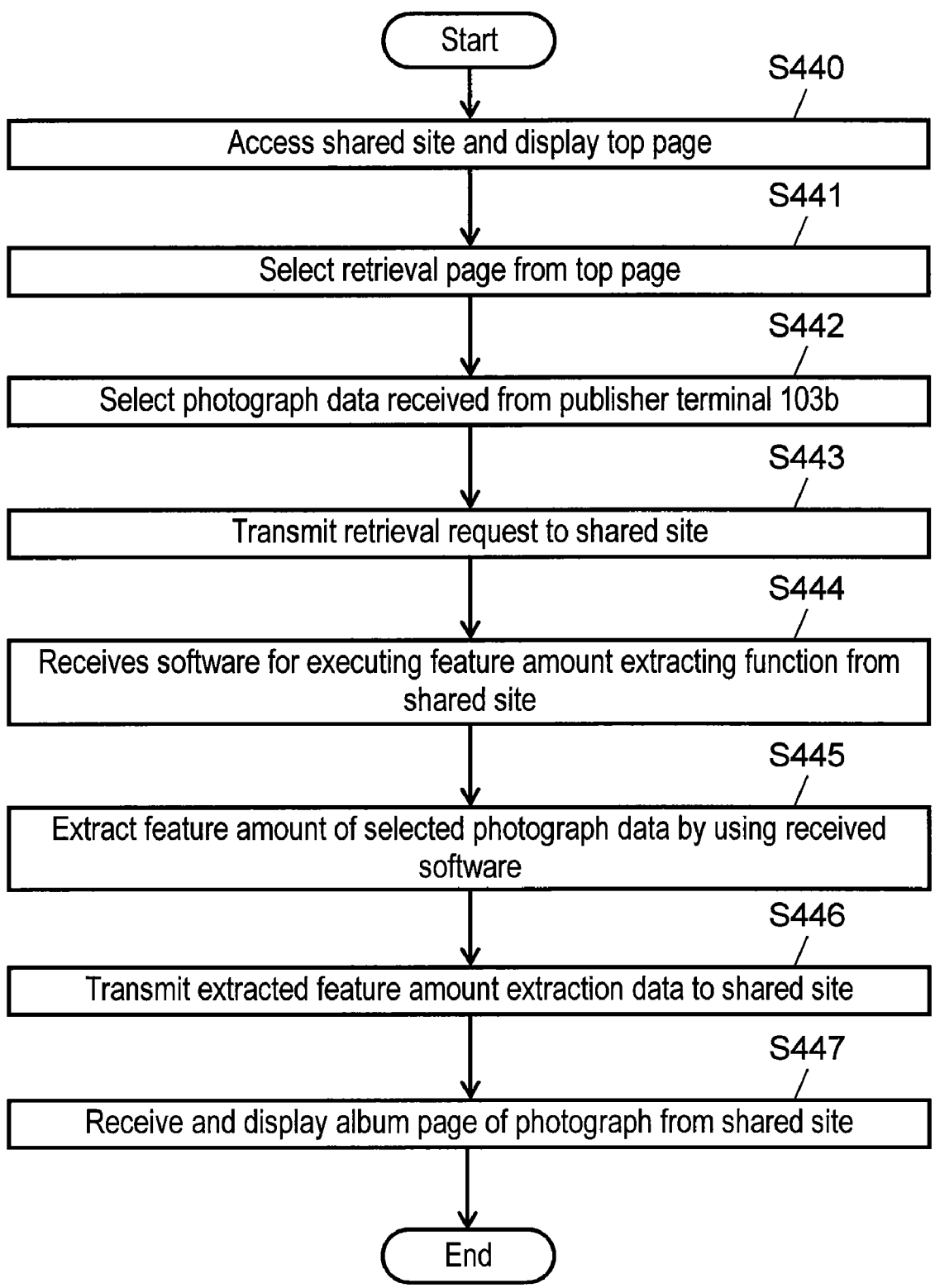
FIG. 16 is a flow chart showing that the retriever terminal of the contents retrieval system receives and displays an album page of a photograph from the shared server.

Next, processing of retriever terminal 104a is described. FIG. 16 is a flow chart showing that retriever terminal 104a of the contents retrieval system receives and displays an album page of a photograph from shared server 102a in accordance with the second exemplary embodiment of the present invention. The substantial difference between this processing flow and the processing flow in accordance with the first exemplary embodiment shown in FIG. 8 is steps S444 to S446. Therefore, only these steps are described and the other steps are not described herein.

Retriever terminal 104a transmits a retrieval request to shared server 102a (step S443). Thereafter, when shared server 102a accepts the retrieval request, retriever terminal 104a receives software for executing a feature amount extracting function from shared server 102a (step S444). Next, retriever terminal 104a extracts a feature amount of the selected photograph data that has been received from publisher terminal 103a and stored in advance by using the received software so as to obtain feature amount extraction data. Herein, the photograph data selected in step 442 are partial data (step S445). Thereafter, partial data are replaced with the extracted function amount extraction data. Then, the partial data as the extracted feature amount are transmitted to shared server 102a (step S446).

As mentioned above, shared server 102b of the contents retrieval system in accordance with this exemplary embodiment further includes feature amount extracting section 206 and feature amount extraction data area 214. Feature amount extracting section 206 extracts a feature amount of the partial data. Feature amount extraction data area 214 as a software storage section stores execution software for extracting the feature amount.

Then, contents DB 202b as the contents storage section stores a feature amount corresponding to the shared contents in contents area 211 as a software storage section. When network I/F 201 as a transmitting and receiving section receives a contents retrieval request from retriever terminal 104a as the second terminal device, contents retrieval section 203 allows the transmitting and receiving section to transmit execution software to the second terminal device.

Retriever terminal 104a as the second terminal device receives execution software from shared server 102a. Retriever terminal 104a extracts a feature amount from partial data by the received execution software. Then, partial data are replaced with the extracted function amount extraction data. Furthermore, retriever terminal 104a transmits partial data as the extracted feature amount to shared server 102a.

Furthermore, when the transmitting and receiving section receives partial data as a feature amount from the second terminal device, contents retrieval section 203 retrieves shared contents stored in a contents storage section and corresponding to the received feature amount. Then, contents retrieval section 203 may allow the transmitting and receiving section to transmit a URL corresponding to the retrieved shared contents to the second terminal device.

Thus, according to the contents retrieval system in this exemplary embodiment, the amount of data for retrieving can be reduced. As a result, processing burden in shared server 102 can be reduced. Furthermore, the data are converted into the feature amount extraction data which only retriever terminal 104 and shared server 102 can know, and the feature amount extraction data can be used for authentication. Thereby, the security can be further improved. Furthermore, it is preferable that a communication load in network 101 can be reduced.

Third Exemplary Embodiment

Figure 17:
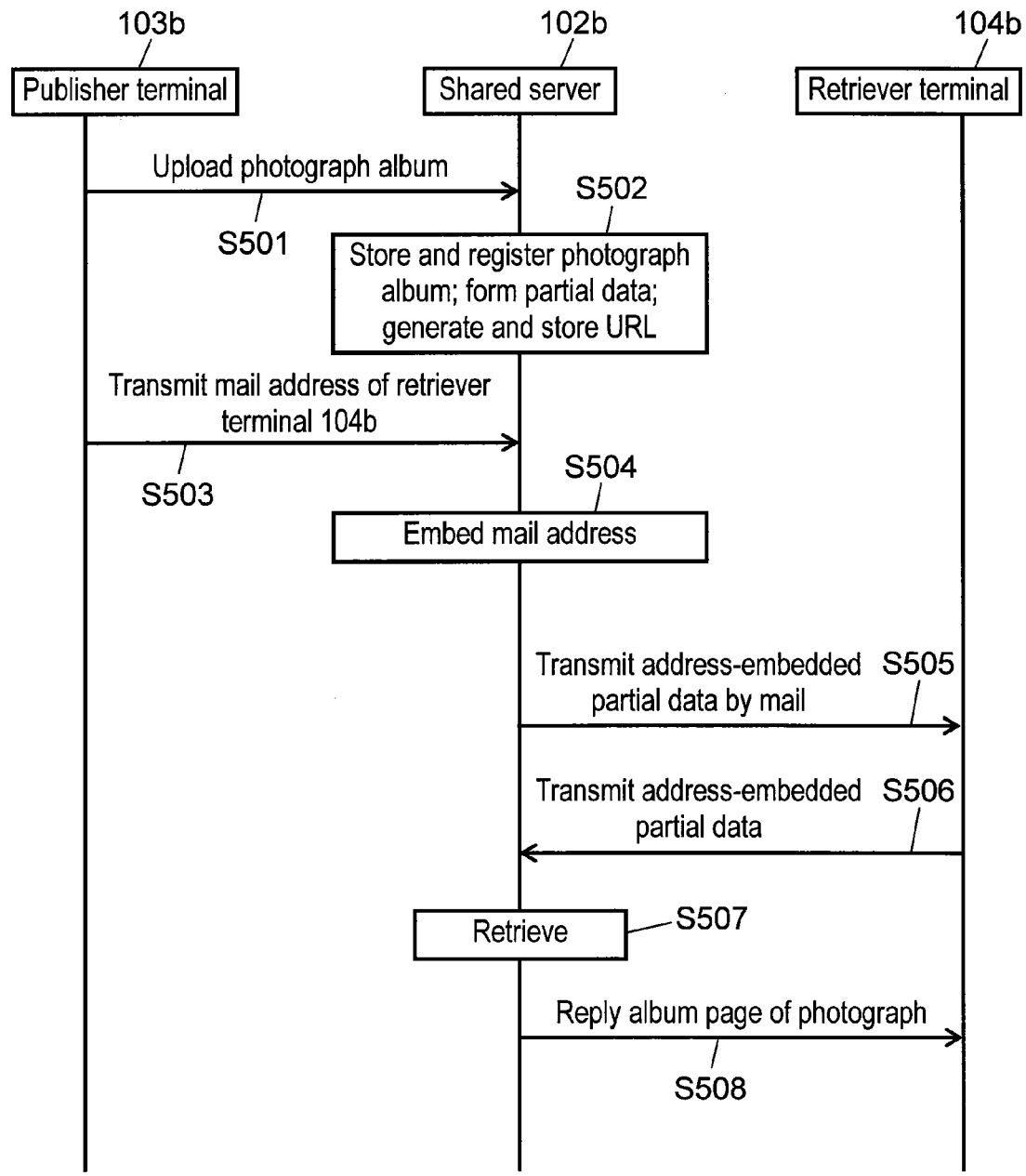
FIG. 17 is a sequence diagram showing the flow of transmission and reception of data and processing in a shared server, a publisher terminal, and a retriever terminal of a contents retrieval system in accordance with a third exemplary embodiment of the present invention.

FIG. 17 is a sequence diagram showing the flow of transmission and reception of data and processing in shared server 102b, publisher terminal 103b, and retriever terminal 104b in accordance with a third exemplary embodiment of the present invention.

In the contents retrieval system in accordance with the first and second exemplary embodiments of the present invention, publisher terminals 103 and 103a do not know whether or not retriever terminals 104 and 104a authorized to retrieve and browse actually retrieve and browse shared servers 102 and 102a. Therefore, a shared publisher of contents cannot know the effect and results of the publication. In the contents retrieval system in this exemplary embodiment, for example, partial data in which a mail address of retriever terminal 104b is embedded is transmitted to retrievers. Then, the retriever replies the partial data. Thus, the contents retrieval system in this exemplary embodiment can know which retriever terminal 104b actually carried out retrieving. Hereinafter, the same reference numerals are given to the same configurations as those in the first and second exemplary embodiments and the description thereof is omitted.

In FIG. 17, firstly, publisher terminal 103b uploads a photograph album to shared server 102b (step S501). Step S501 and step S502 are the same as in step S301 and step S302 in the first exemplary embodiment shown in FIG. 3. Therefore, detailed description thereof is omitted.

Thereafter, publisher terminal 103b as the first terminal device transmits a mail address of retriever terminal 104b, which is the second terminal device authorized to retrieve and browse, to shared server 102b (step S503). That is to say, step S503 is a fifth receiving step in which shared server 102b receives a mail address of the second terminal device to be authorized to retrieve the shared contents from the first terminal device. Next, step S504 is a second partial data formation step in which shared server 102b embeds the received mail address into the previously formed partial data so as to newly form mail address-embedded partial data. Thereafter, step S505 is a fifth transmission step in which shared server 102b transmits mail address-embedded partial data to retriever terminal 104b.

Retriever terminal 104b transmits mail address-embedded partial data to shared server 102b for retrieving (step S506). When network I/F 201 as the transmitting and receiving section receives partial data having a mail address from the second terminal device, contents retrieval section 203 of shared server 102b collates the address-embedded partial data previously obtained and formed in step S503 with the address-embedded partial data received from retriever terminal 104b and stored in contents area 211 as a contents storing section. Thus, contents retrieval section 203 retrieves shared contents corresponding to the partial data (step S507). That is to say, in the second receiving step, shared server 102b receives partial data having a mail address from the second terminal device. Then, in the retrieval step, shared server 102b retrieves the corresponding shared contents by using the received partial data having a mail address as the partial data. Since the mail address of retriever terminal 104b is embedded in the address-embedded partial data received by shared server 102b, shared server 102b can know that a retriever is retriever terminal 104b.

Shared server 102b carries out retrieving in step S507. As a result, when the relevant photograph album is found, shared server 102b reads out a URL associated with the photograph album from URL area 213 and transmits an album page of a photograph linked to the URL to retriever terminal 104b (step S508). The retriever cans also browse or download all or a part of the photograph album in the album page so as to store it in retriever terminal 104b.

Figure 18:
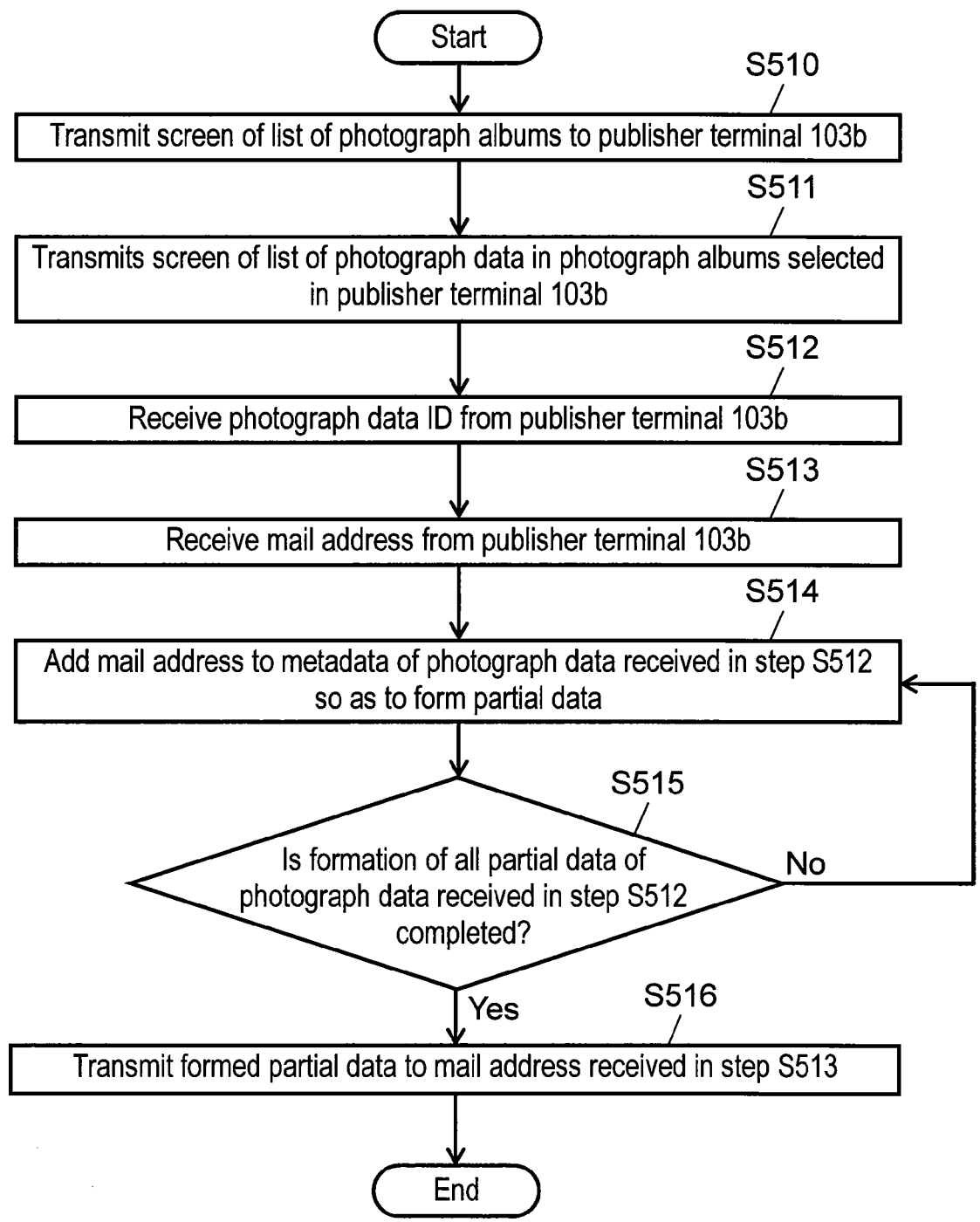
FIG. 18 is a flow chart showing that the shared server of the contents retrieval system receives a photograph album from the publisher terminal, registers it in database, and then transmits a mail address to the retriever terminal.

Next, the operation flow of shared server 102b and publisher terminal 103b is described. FIG. 18 is a flow chart showing that shared server 102b receives a photograph album from publisher terminal 103b, registers it in database, and then transmits a mail address to retriever terminal 104b. In FIG. 18, firstly, shared server 102b transmits a screen of a list of photograph albums to publisher terminal 103b (step S510). Then, shared server 102b transmits the screen of list of photograph data in the photograph albums selected in publisher terminal 103b (step S511). Then, shared server 102b receives photograph data ID from publisher terminal 103b (step S512). Subsequently, shared server 102b receives a mail address from publisher terminal 103b (step S513). Then, shared server 102b adds a mail address to the metadata of photograph data received in step S512 so as to form partial data (step S514). Next, shared server 102b determines whether or not formation of all the partial data of the photograph data received in step S512 is completed (step S515). When formation is completed (in the case of "Yes"), the processing proceeds to step S516. Then, the formed partial data are transmitted to the mail address received in step S513 (step S516). On the other hand, when formation is not completed in step S515 (in the case of "No"), the processing returns to step S514 and continues formation of partial data.

Figure 19:
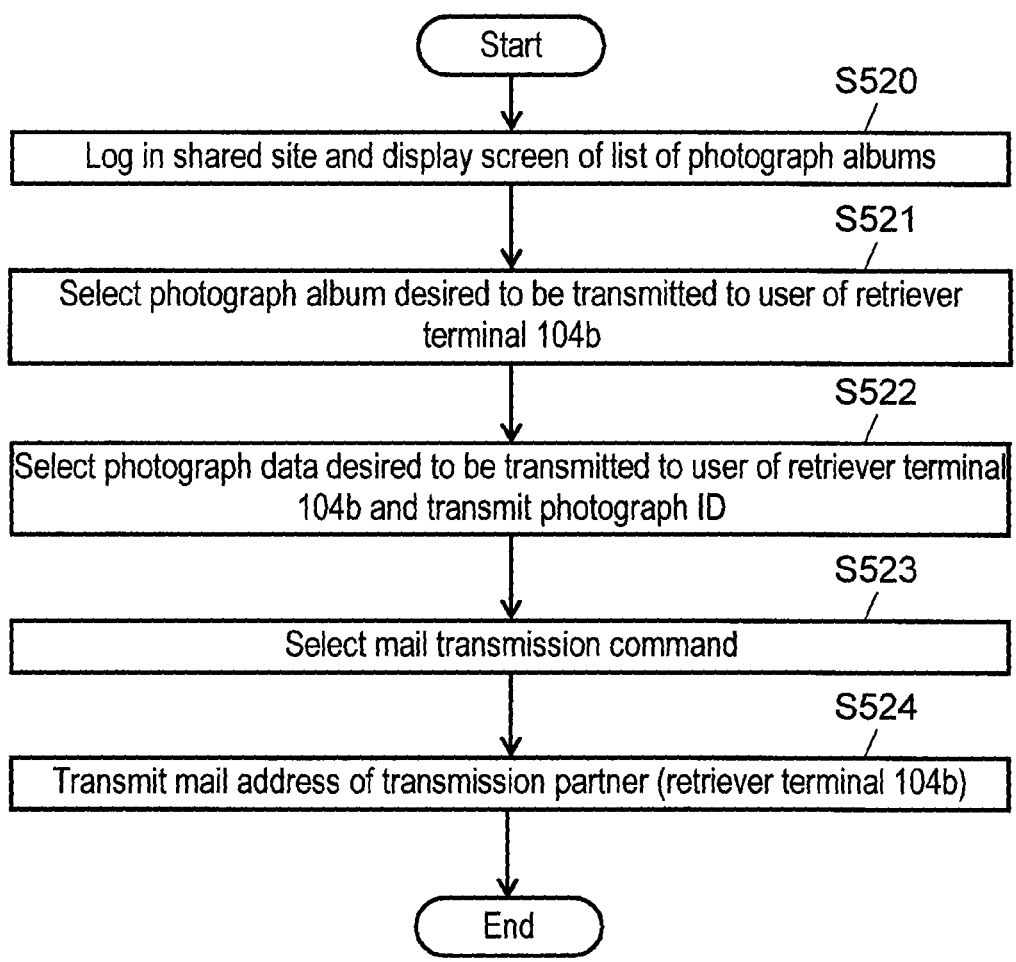
FIG. 19 is a flow chart showing that the publisher terminal of the contents retrieval system selects photograph data and transmits a mail address to the retriever terminal.

Next, processing of publisher terminal 103b is described. FIG. 19 is a flow chart showing a processing in which publisher terminal 103b selects photograph data and transmits a mail address of retriever terminal 104b to shared server 102b. Publisher terminal 103b logs in a shared site and displays a screen of list of the photograph albums (step S520). Next, publisher terminal 103b selects a photograph album desired to be transmitted to a user of retriever terminal 104b (step S521). Subsequently, publisher terminal 103b selects photograph data desired to be transmitted to a user of retriever terminal 104b and transmits photograph data ID to shared server 102b (step S522). Finally, publisher terminal 103b selects a mail transmission command (step S523). Then, publisher terminal 103b transmits a mail address of retriever terminal 104b as a transmission partner to shared server 102b (step S524).

Figure 20:
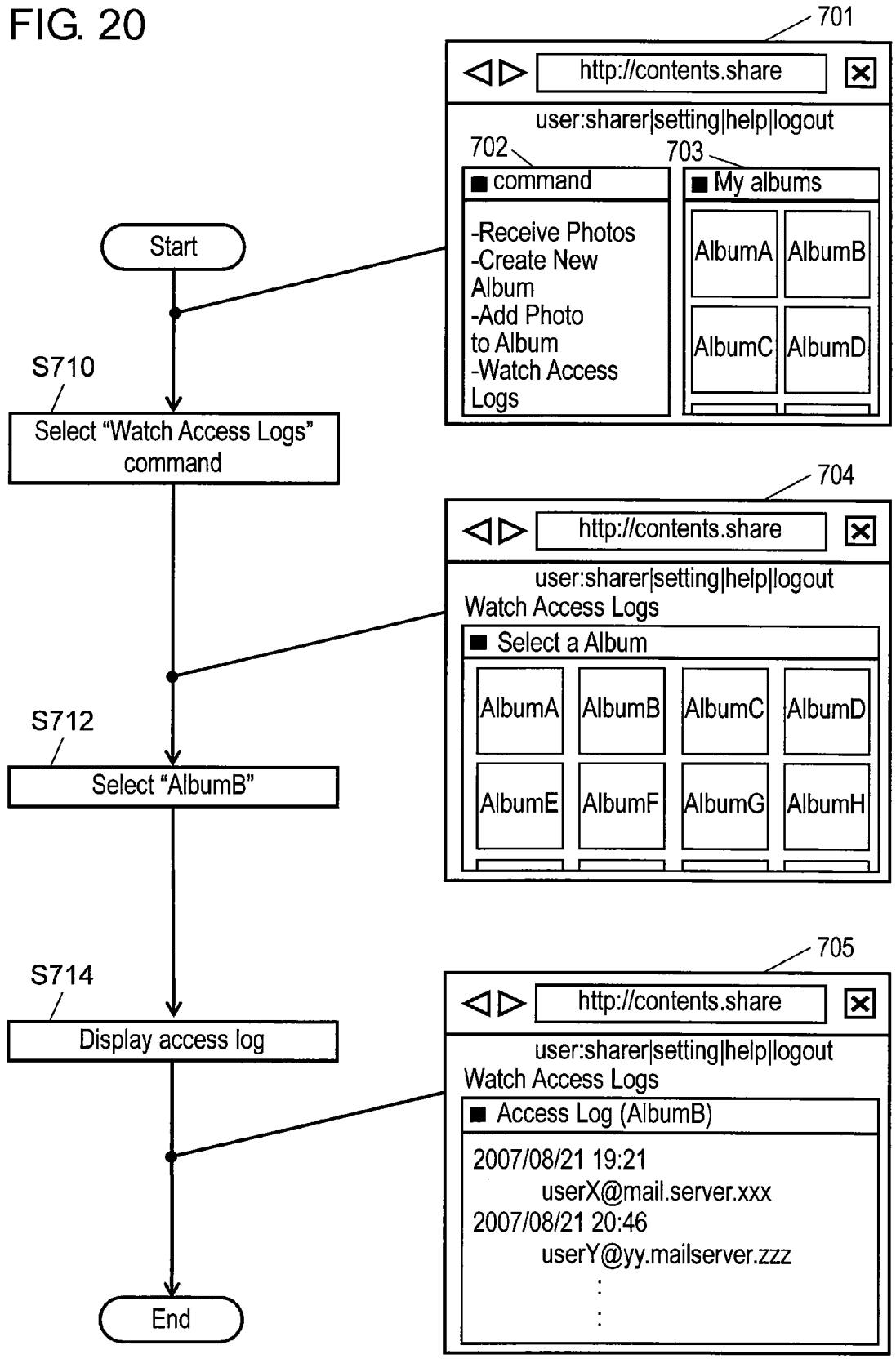
FIG. 20 is a flow chart showing an example of an operation of a publisher in a shared site when a publisher of the contents retrieval system logs in a contents shared site by using a publisher terminal.

Next, a flow in which a publisher knows a retriever who retrieves and browses shared contents by using a screen of publisher terminal 103b is described. FIG. 20 is a flow chart showing an example of an operation of a publisher in a shared site when the publisher logs in the contents shared site by using publisher terminal 103b. Note here that screens 701, 704 and 705 show an example of a screen of publisher terminal 103b when the publisher logs in the contents shared site.

Firstly, a publisher selects "Watch Access Logs" command from command menu window 702 of screen 701 when the publisher logs in the contents shared site (step S710). Then, the screen is switched to selection screen 704 of the photograph album, in which my albums window 703 is enlarged. Next, in selection screen 704 of the photograph album, the publisher selects, for example, "Album B" (step S712). Then, access logs to "Album B" to date are displayed in access log display screen 705 (step S714). The publisher can easily know which publisher retrieves and browses "Album B" by only confirming access log display screen 705.

As described above, the present invention can provide contents retrieval system in which shared contents such as photographs taken by a digital camera, moving picture taken by a digital video camera, and image data digitalized by using a scanner are stored in the shared server on the network, and the shared contents are allowed to be browsed by only a plurality of certain retrievers. A retriever can retrieve and browse certain terminals by using partial data in the contents, for example, one photograph in a photograph album without using conventional alphanumeric characters such as ID and password, which cannot be easily remembered. Furthermore, the character strings such as ID, password, or URL have a problem that it is difficult to grasp the correspondence between the photograph album and the character string. However, by using partial data in the contents, the partial data can be associated with the photograph album intuitively.

Furthermore, a publisher notifies a shared server of a mail address and the like of retrievers authorized to retrieve and browse in advance. Thereby, from the partial data having a mail address transmitted from a retriever for authentication, the publisher can easily know who retrieves and browses the shared contents.

In addition, a personal computer of a user connected to the network, and hardware of the shared server providing services do not need addition nor change. A contents retrieval system of the present invention can be achieved only by preparing an operation screen provided by a service provider and processing software inside the server. Thus, the contents retrieval system of the present invention can be put to practical use extremely easily.

Fourth Exemplary Embodiment

Figure 21:
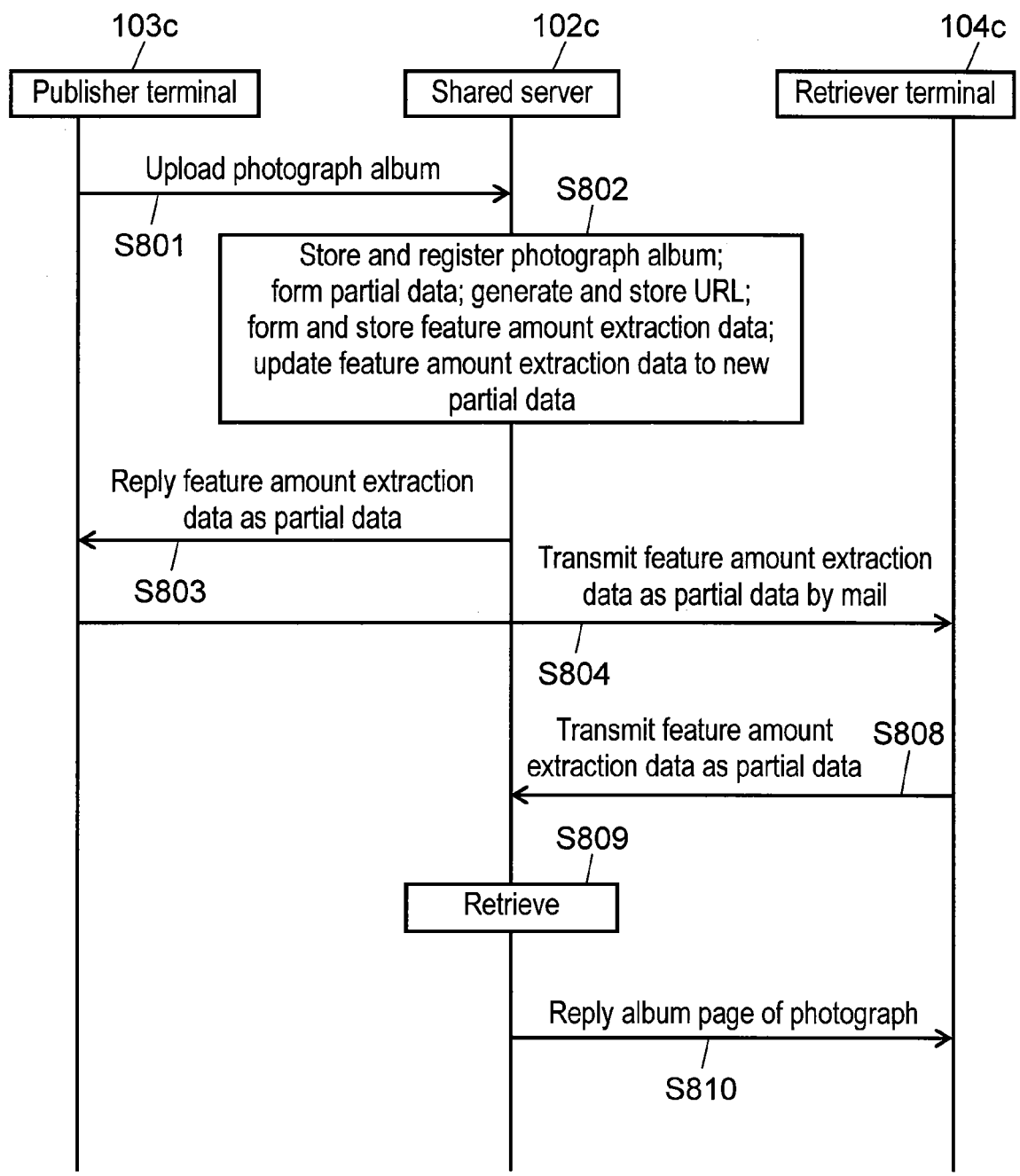
FIG. 21 is a sequence diagram showing the flow of transmission and reception of data and processing when a shared server of a contents retrieval system in accordance with a fourth exemplary embodiment of the present invention.

FIG. 21 is a sequence diagram showing the flow of transmission and reception of data and processing when shared server 102c of a contents retrieval system retrieves shared contents by using a feature amount extraction data in accordance with a fourth exemplary embodiment of the present invention. Furthermore, the function block diagram showing an internal configuration of shared server 102c of the contents retrieval system in accordance with this exemplary embodiment is equivalent to shared server 102a in accordance with the second exemplary embodiment shown in FIG. 10.

In the second exemplary embodiment, retriever terminal 104a shown in FIG. 13 forms feature amount extraction data, and then retriever terminal 104a transmits the result to shared server 102a. However, shared server 102c of the contents retrieval system in accordance with the fourth exemplary embodiment may transmit feature amount extraction data extracted in feature amount extracting section 206 as partial data to publisher terminal 103c, and publisher terminal 103c may transmit the feature amount extraction data to retriever terminal 104c.

This can reduce an amount of data for retrieving, resulting in further reducing the processing load of shared server 102c as compared with the second exemplary embodiment. Furthermore, the data are converted into the feature amount extraction data which only retriever terminal 104 and shared server 102 can know, and the feature amount extraction data are used for authentication. Thereby, the security can be further improved. Furthermore, it is preferable that the communication load in network 101 can be reduced as compared with the second exemplary embodiment.

Next, the flow of transmission and reception of data and processing when shared contents are retrieved by using the feature amount extraction data of the contents retrieval system in this exemplary embodiment is described. As shown in FIG. 21, firstly, similar to FIG. 13, publisher terminal 103c uploads a photograph album including a plurality of photograph data to shared server 102c (step S801). Also in the following step S802, a portion similar to that of step 402 shown in FIG. 13 is omitted. That is to say, shared server 102c forms feature amount extraction data from partial data. Thereafter, shared server 102c updates the partial data so that the feature amount extraction data extracted from partial data are made to be new partial data and stores them.

Then, shared server 102c replies the feature amount extraction data as new partial data to publisher terminal 103c (step S803). Publisher terminal 103c transmits the above-mentioned new partial data to retriever terminal 104c authorized to retrieve and browse by mail (step S804). Thereafter, retriever terminal 104c transmits new partial data to shared server 102a for retrieving (step S808). Shared server 102c retrieves the shared contents by collating the feature amount extraction data extracted and stored as the new partial data in step S802 with partial data as new feature amount received from retriever terminal 104a (step S409).

When the relevant photograph album is found, shared server 102c reads out a URL associated with the photograph album from URL area 213. Then, shared server 102c transmits an album page of the photograph linked to this URL to retriever terminal 104c (step S410). A retriever may browse or download all or a part of the photograph album from the photograph album page and stores it in retriever terminal 104c.

Next, the operation flow of shared server 102c and retriever terminal 104c is described. Note here that the processing of publisher terminal 103c is the same as in the second exemplary embodiment. The processing is different only in the following point: one photograph is used as partial data, or feature amount extraction data formed by extracting from the partial data are used. Therefore, detailed description thereof is omitted.

Figure 22:
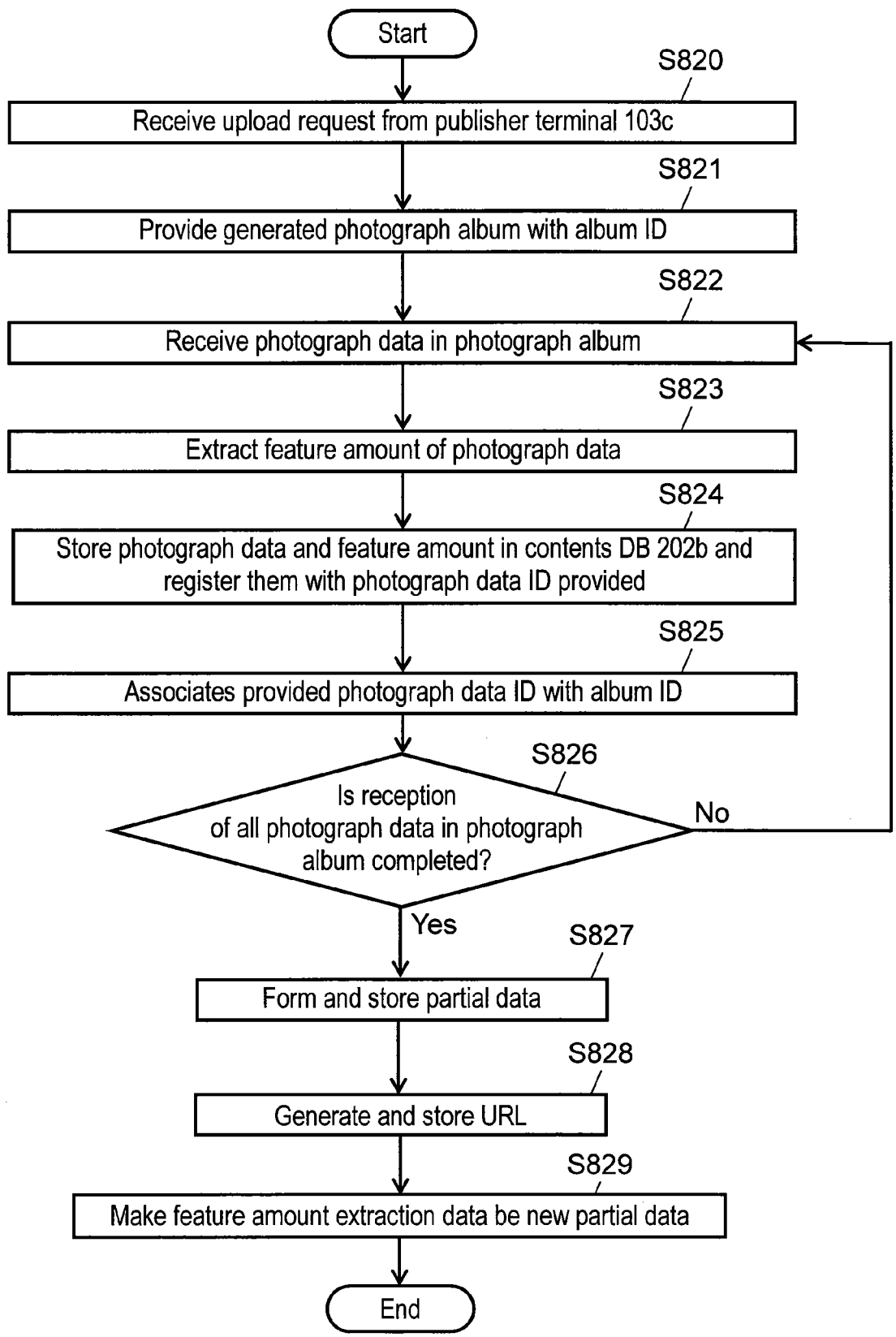
FIG. 22 is a flow chart showing that the shared server of the contents retrieval system receives a photograph album from the publisher terminal and registers it in a contents DB.

FIG. 22 is a flow chart showing that shared server 102c of the contents retrieval system receives a photograph album from publisher terminal 103c and registers it in contents DB 202b in accordance with the fourth exemplary embodiment of the present invention. This processing flow is substantially the same as the processing flow in the second exemplary embodiment shown in FIG. 14 except that step S829 is added. In step S829, shared server 102a makes feature amount extraction data stored in feature amount extraction data area 214 of contents DB 202b be new partial data. The other processing is substantially the same as in the second exemplary embodiment and therefore the description thereof is omitted.

Figure 23:
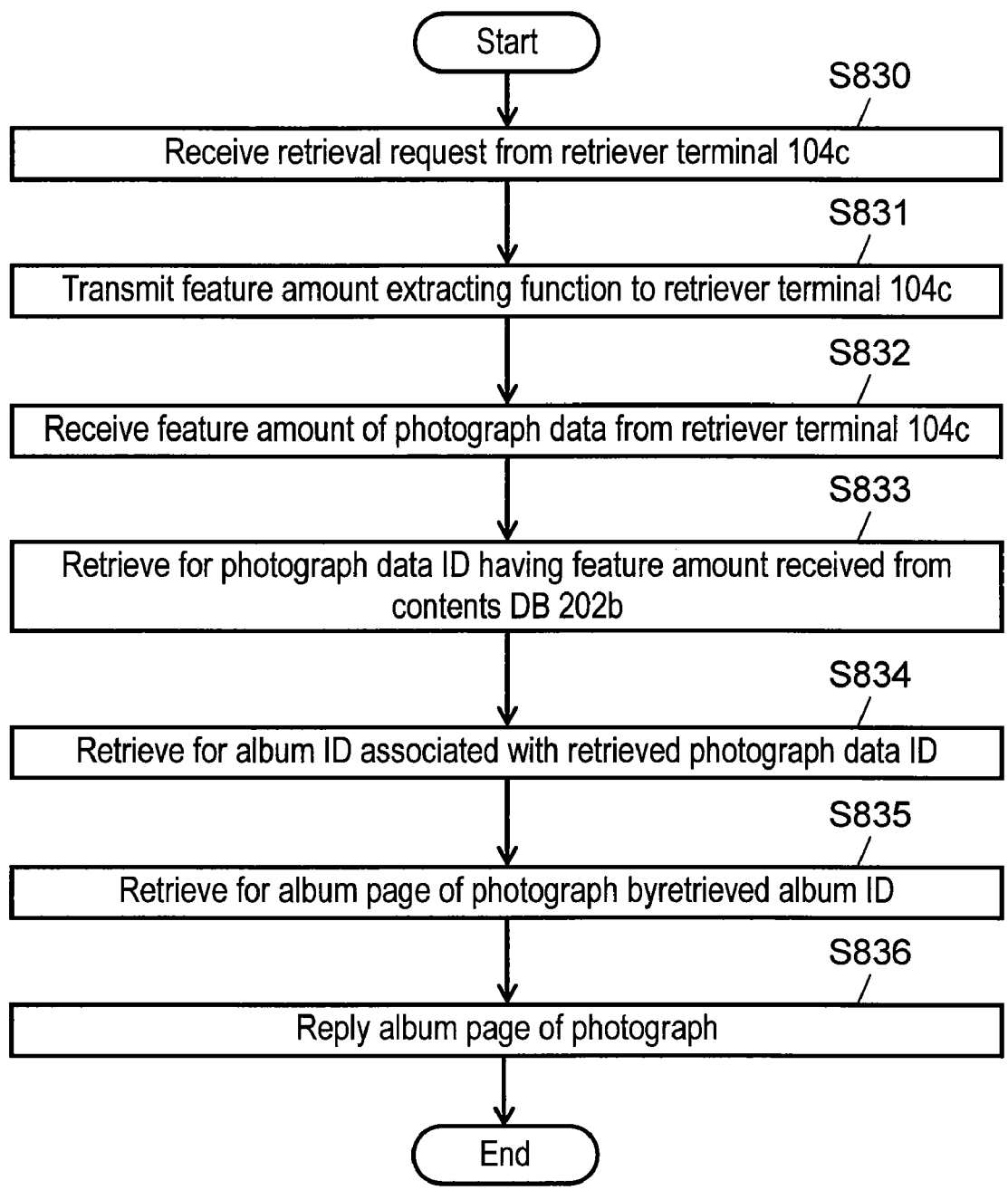
FIG. 23 is a flow chart showing that the shared server of the contents retrieval system receives a retrieval request from the retriever terminal and replies an album page of the generated photograph.

FIG. 23 is a flow chart showing that shared server 102c of the contents retrieval system receives a retrieval request from retriever terminal 104c and replies an album page of the generated photograph in accordance with the fourth exemplary embodiment of the present invention. Firstly, shared server 102c receives a retrieval request from retriever terminal 104c (step S830). Thereafter, shared server 102c receives a feature amount of photograph data from retriever terminal 104c (step S832). As mentioned above, this flow chart is different from that in the second exemplary embodiment shown in FIG. 15 in that a part corresponding to step S431 is not necessary. Since the flows thereafter are the same as in the second exemplary embodiment, the description thereof is omitted.

Figure 24:
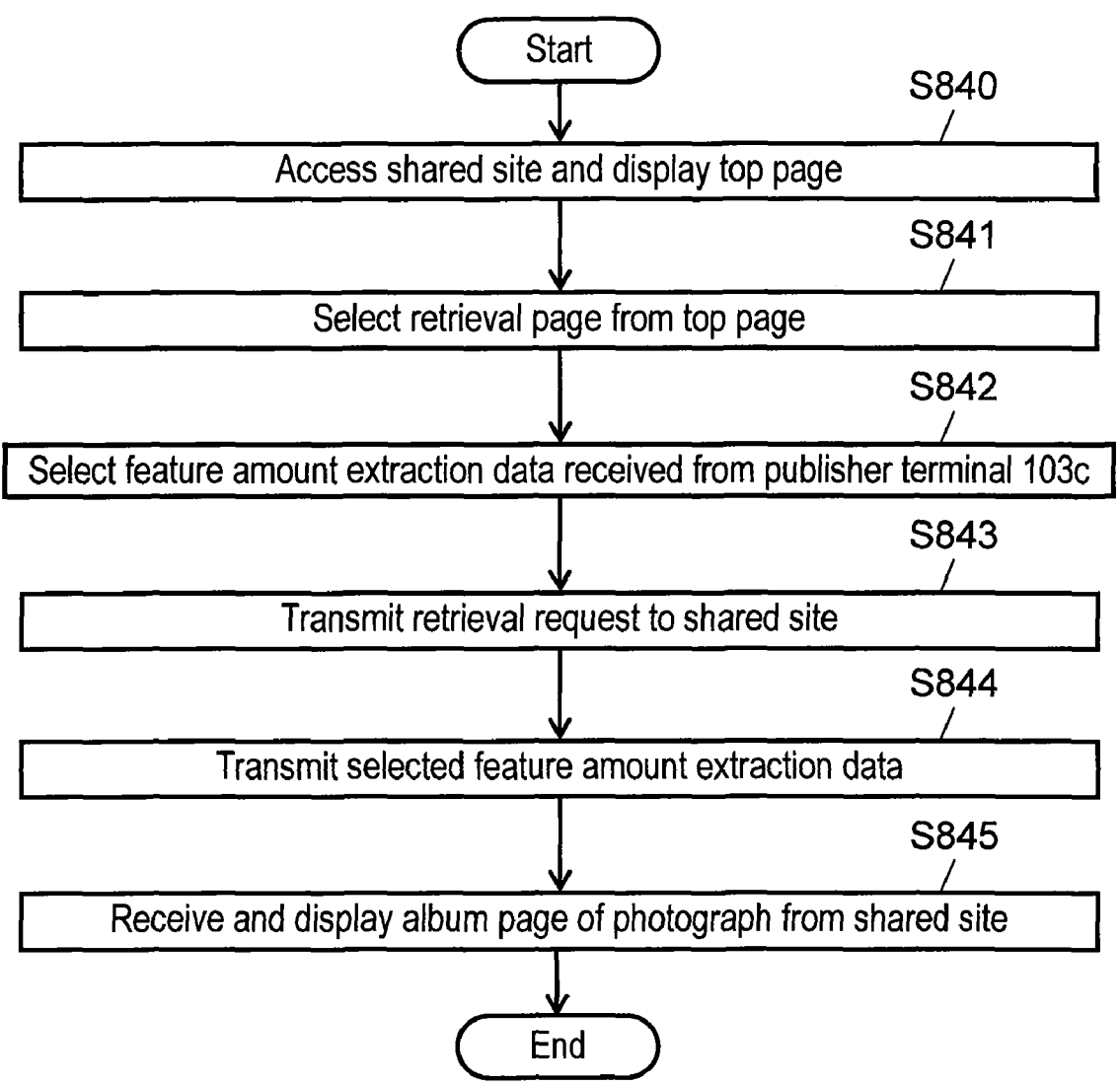
FIG. 24 is a flow chart showing processing in which the retriever terminal of the contents retrieval system receives and displays an album page of a photograph from the shared server.

Next, processing of retriever terminal 104c is described. FIG. 24 is a flow chart showing processing in which retriever terminal 104c of the contents retrieval system receives and displays an album page of a photograph from shared server 102c in accordance with the fourth exemplary embodiment of the present invention.

In step S842, retriever terminal 104c transmits feature amount extraction data to shared server 102a. The substantial difference between this processing flow and the processing flow in the first exemplary embodiment shown in FIG. 8 is step S842. Therefore, only this step is described and the description of the other steps is omitted.

Thus, according to the contents retrieval system in this exemplary embodiment, an amount of data for retrieving is reduced. As a result, processing burden in shared server 102c can be reduced. Furthermore, the data are converted into the feature amount extraction data which only retriever terminal 104c, publisher terminal 103c and shared server 102c can know, and the feature amount extraction data are used for authentication. Thereby, the security can be further improved. It is preferable that the communication load in network 101 can be reduced as compared with the second exemplary embodiment.

Note here that in this exemplary embodiment, only data extracting a feature amount of photograph data of a certain photograph is transmitted from publisher terminal 103c to retriever terminal 104c. Therefore, it is important that a retriever can easily associate feature amount extraction data as the feature amount with the contents of the photograph album. Therefore, it is desirable that the title or date of the photograph album, memorandum by a publisher summarizing the content, and the like, are used as the feature amount extraction data.

INDUSTRIAL APPLICABILITY

The present invention can be generally widely applied to a system in which contents such as digital photographs are shared in the Internet and which authorizes certain terminals to detect and browse the contents.

The invention claimed is:

1. A contents retrieval system comprising:
   a shared server for storing one or a plurality of shared contents;
   a first terminal device for transmitting the shared contents to the shared server; and
   a second terminal device for receiving the shared contents from the shared server,
   the shared server, the first terminal device and the second terminal device being connected to network,
   wherein the shared server includes:
      a transmitting and receiving section for transmitting and receiving data with respect to the first terminal device and the second terminal device,
      a partial data formation section for forming partial data corresponding to the shared contents,
      a metadata extracting section for extracting metadata from the partial data,
      a software storage section for storing execution software for extracting the metadata from the partial data,
      a URL generation section for generating a URL corresponding to the shared contents,
      a contents storage section for storing the shared contents, the partial data, the metadata, and the URL in such a way that they correspond with each other, and
      a contents retrieval section for retrieving the shared contents corresponding to the metadata,
   when the shared server replies the partial data to the first terminal device, the first terminal device transmits the partial data to the second terminal device,
   when the transmitting and receiving section receives a contents retrieval request from the second terminal device, the contents retrieval section allows the transmitting and receiving section to transmit the execution software to the second terminal device,
   the second terminal device receives the execution software from the shared server, extracts the metadata from the partial data received from the first terminal using the received execution software, and transmits the metadata to the shared server,
   the contents retrieval section retrieves the shared contents corresponding to the received metadata, and
   the transmitting and receiving section transmits the URL corresponding to the retrieved shared contents to the second terminal device,
   wherein the shared contents are at least one of:
   i) a photograph album including a plurality of photograph data, and the partial data are at least a certain piece of photograph data in the photograph album, and
   ii) moving image data, and the partial data are at least a certain frame of moving image data in the moving image data.

2. The contents retrieval system of claim 1,
   wherein the first terminal device forms the partial data of the shared contents, and transmits the partial data to both the shared server and the second terminal device or to only the second terminal device.

3. The contents retrieval system of claim 1, wherein the contents storage section uses metadata corresponding to the shared contents as the partial data so as to update the partial data, and stores the updated partial data in the partial data formation section.

4. A contents retrieval system comprising:
a shared server for storing one or a plurality of shared contents;
a first terminal device for transmitting the shared contents to the shared server; and
a second terminal device for receiving the shared contents from the shared server,
the shared server, the first terminal device and the second terminal device being connected to network,
wherein the shared server includes:
  a transmitting and receiving section for transmitting and receiving data with respect to the first terminal device and the second terminal device, the transmitting and receiving section receiving a mail address of the second terminal device,
  a partial data formation section for forming partial data corresponding to the shared contents and for embedding the mail address into the partial data to form address-embedded partial data,
  a URL generation section for generating a URL corresponding to the shared contents,
  a contents storage section for storing the shared contents, the address-embedded partial data, and the URL in such a way that they correspond with each other, and
  a contents retrieval section for retrieving the shared contents corresponding to the address-embedded partial data,
the second terminal device transmits the address-embedded partial data to the shared server,
the transmitting and receiving section receives the address-embedded partial data from the second terminal device,
the contents retrieval section retrieves the shared contents corresponding to the received address-embedded partial data, and
the transmitting and receiving section transmits the URL corresponding to the retrieved shared contents to the second terminal device,
wherein the shared contents are at least one of:
i) a photograph album including a plurality of photograph data, and the partial data are at least a certain piece of photograph data in the photograph album, and
ii) moving image data, and the partial data are at least a certain frame of moving image data in the moving image data.

5. The contents retrieval system of claim 4, wherein the first terminal device receives the partial data from the shared server, and transmits the received partial data to the second terminal device.

6. The contents retrieval system of claim 4, wherein the first terminal device forms the partial data of the shared contents, and transmits the partial data to both the shared server and the second terminal device or to only the second terminal device.

7. A contents retrieval method of a contents retrieval system, the contents retrieval system including:
a shared server for storing one or a plurality of shared contents;
a first terminal device for transmitting the shared contents to the shared server; and
a second terminal device for receiving the shared contents from the shared server, in which the shared server, the first terminal device and the second terminal device being connected to a network,
the method comprising:
in the shared server,
  a first receiving step of receiving the shared contents from the first terminal device;
  a first storing step of storing the shared contents in the shared server;
  a first partial data formation step of forming partial data corresponding to the received shared contents;
  a URL formation step of forming a URL corresponding to the received shared contents;
  a first metadata extraction step of extracting metadata from the partial data;
  a second storing step of storing the partial data, the metadata, and the URL in the shared server in such a way that the partial data, the metadata, and the URL correspond with the shared contents; and
  a first replying step of replying the partial data to the first terminal device;
in the first terminal device,
  a first transmitting step of transmitting the partial data, which are received from the shared server in the replying step, to the second terminal device;
in the shared server,
  a second receiving step of receiving a contents retrieval request from the second terminal device; and
  a second transmitting step of transmitting execution software for extracting the metadata to the second terminal device when the contents retrieval request is received;
in the second terminal device,
  a second metadata extraction step of extracting the metadata from the partial data by using a metadata extracting function of the execution software; and
  a third transmitting step of transmitting the metadata to the shared server;
further, in the shared server,
  a third receiving step of receiving the metadata from the second terminal device;
  a first retrieving step of retrieving the shared contents corresponding to the received metadata; and
  a fourth transmitting step of transmitting the URL corresponding to the retrieved shared contents to the second terminal device,
wherein the shared contents are at least one of:
i) a photograph album including a plurality of photograph data, and the partial data are at least a certain piece of photograph data in the photograph album, and
ii) moving image data, and the partial data are at least a certain frame of moving image data in the moving image data.

8. A contents retrieval method of a contents retrieval system, the contents retrieval system including:
a shared server for storing one or a plurality of shared contents;
a first terminal device for transmitting the shared contents to the shared server;
a second terminal device for receiving the shared contents from the shared server, in which the shared server, the first terminal device and the second terminal device being connected to a network; and the method comprising:
in the shared server,
- a first receiving step of receiving the shared contents from the first terminal device;
- a first storing step of storing the shared contents in the shared server;
- a first partial data formation step of forming partial data corresponding to the received shared contents;
- a second receiving step of receiving a mail address of the second terminal device from the first terminal device;
- a second partial data formation step of embedding the mail address in the partial data to form address-embedded partial data;
- a URL formation step of forming a URL corresponding to the received shared contents;
- a second storing step of storing the partial data, the address-embedded partial data, and the URL in the shared server in such a way that the partial data and URL correspond with the shared contents;
- a first transmitting step of transmitting the address-embedded partial data to the second terminal device;
- a third receiving step of receiving the address-embedded partial data from the second terminal device;
- a first retrieving step of retrieving the shared contents corresponding to the received address-embedded partial data; and
- a second transmitting step of transmitting the URL corresponding to the retrieved shared contents to the second terminal device, wherein the shared contents are at least one of:
i) a photograph album including a plurality of photograph data, and the partial data are at least a certain piece of photograph data in the photograph album, and
ii) moving image data, and the partial data are at least a certain frame of moving image data in the moving image data.

* * * * *

UNITED STATES PATENT AND TRADEMARK OFFICE
CERTIFICATE OF CORRECTION

| | |
|---|---|
| PATENT NO. | : 8,347,363 B2 |
| APPLICATION NO. | : 12/598095 |
| DATED | : January 1, 2013 |
| INVENTOR(S) | : Toshiyuki Tanaka |

It is certified that error appears in the above-identified patent and that said Letters Patent is hereby corrected as shown below:

In the Claims:

Column 23, between lines 35 and 36, in claim 4 (original claim 7), insert the following line:

--the transmitting and receiving section transmits the address-embedded partial data to the second terminal device,--.

Signed and Sealed this
Twenty-third Day of April, 2013

Teresa Stanek Rea
*Acting Director of the United States Patent and Trademark Office*